(12) United States Patent
Kagoshima et al.

(10) Patent No.: US 11,908,487 B2
(45) Date of Patent: Feb. 20, 2024

(54) SIGNAL PROCESSING APPARATUS AND NON-TRANSITORY COMPUTER READABLE MEDIUM

(71) Applicant: KABUSHIKI KAISHA TOSHIBA, Tokyo (JP)

(72) Inventors: Takehiko Kagoshima, Yokohama (JP); Daichi Hayakawa, Inzai (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 232 days.

(21) Appl. No.: 17/187,559

(22) Filed: Feb. 26, 2021

(65) Prior Publication Data

US 2022/0084539 A1  Mar. 17, 2022

(30) Foreign Application Priority Data

Sep. 16, 2020 (JP) .................. 2020-155629

(51) Int. Cl.
*G10L 25/30* (2013.01)
*H04R 1/32* (2006.01)
*G10L 25/03* (2013.01)

(52) U.S. Cl.
CPC .............. *G10L 25/30* (2013.01); *G10L 25/03* (2013.01); *H04R 1/326* (2013.01)

(58) Field of Classification Search
None
See application file for complete search history.

(56) References Cited

U.S. PATENT DOCUMENTS

| | | | | |
|---|---|---|---|---|
| 7,099,821 | B2 * | 8/2006 | Visser | H04R 3/005 704/226 |
| 8,923,529 | B2 * | 12/2014 | McCowan | H04R 3/005 381/92 |
| 9,143,879 | B2 * | 9/2015 | McElveen | H04S 3/002 |
| 9,788,119 | B2 * | 10/2017 | Vilermo | H04R 3/005 |
| 9,961,437 | B2 * | 5/2018 | McLaughlin | H04R 3/005 |
| 10,839,822 | B2 * | 11/2020 | Chen | G10L 25/30 |
| 10,863,296 | B1 * | 12/2020 | Thoshkahna | H04R 29/005 |
| 11,190,900 | B2 * | 11/2021 | McElveen | H04R 1/406 |
| 11,445,295 | B2 * | 9/2022 | Chen | G10L 25/30 |
| 2021/0204073 | A1 * | 7/2021 | Elmedyb | H04R 25/70 |

FOREIGN PATENT DOCUMENTS

JP         6099032 B2    3/2017
WO    WO2019/198306 A1  10/2019

* cited by examiner

*Primary Examiner* — Paul W Huber
(74) *Attorney, Agent, or Firm* — Oblon, McClelland, Maier & Neustadt, L.L.P.

(57) ABSTRACT

A signal processing apparatus according an embodiment includes an acquisition unit and an application unit. The acquisition unit acquires M detection signals output from M detector devices having N-fold symmetry (M is an integer equal to or greater than 2, and N is an integer equal to or greater than 2). Each of the M detector devices detects original signals generated from K signal sources (K is an integer equal to or greater than 2) having the N-fold symmetry. The application unit applies a trained neural network to M input vectors corresponding to the M detection signals and outputs K output vectors. The same parameter is set to, of multiple weights included in a weight matrix of the trained neural network, weights that are commutative based on the N-fold symmetry.

14 Claims, 13 Drawing Sheets

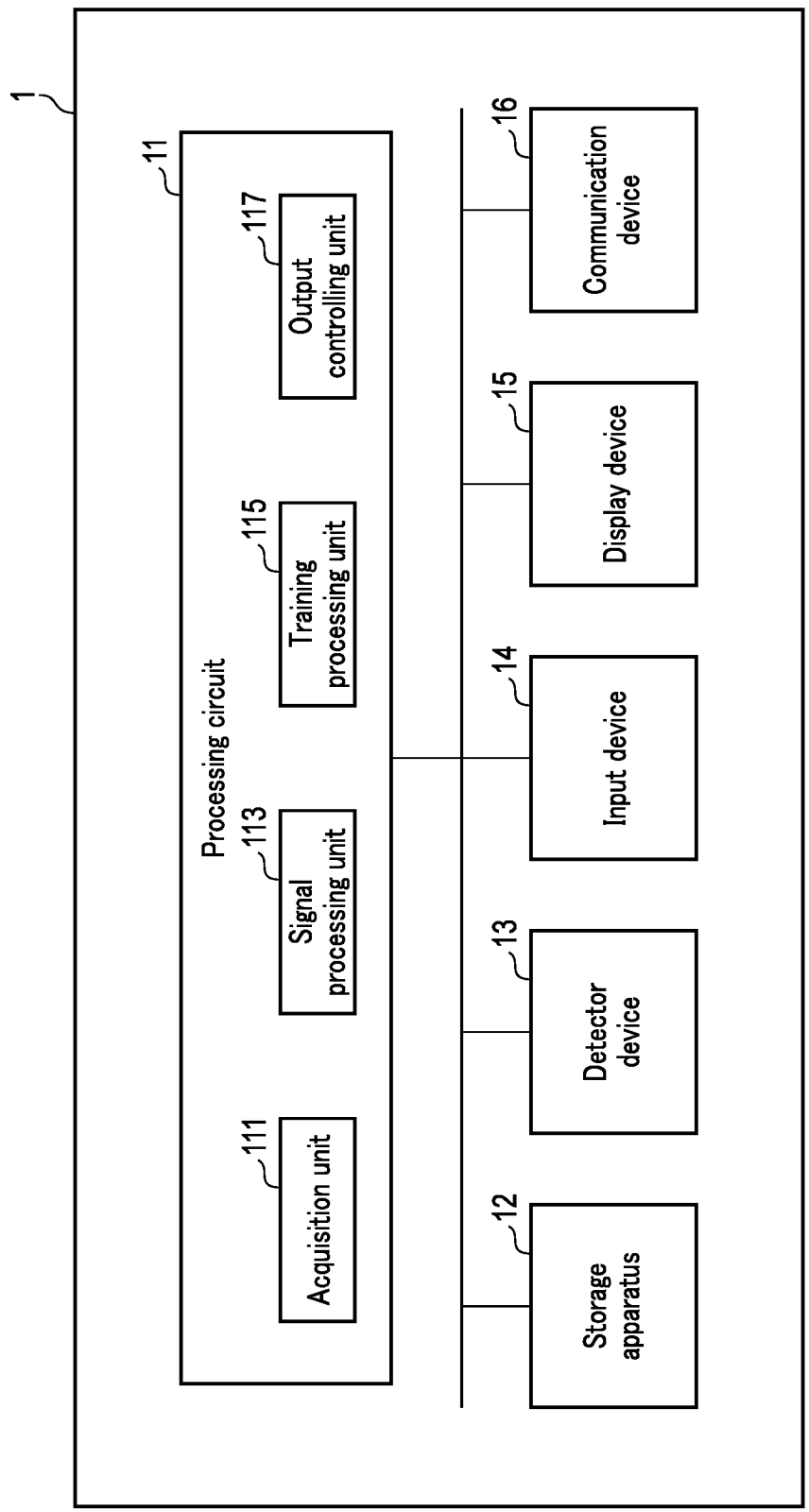
F I G. 1

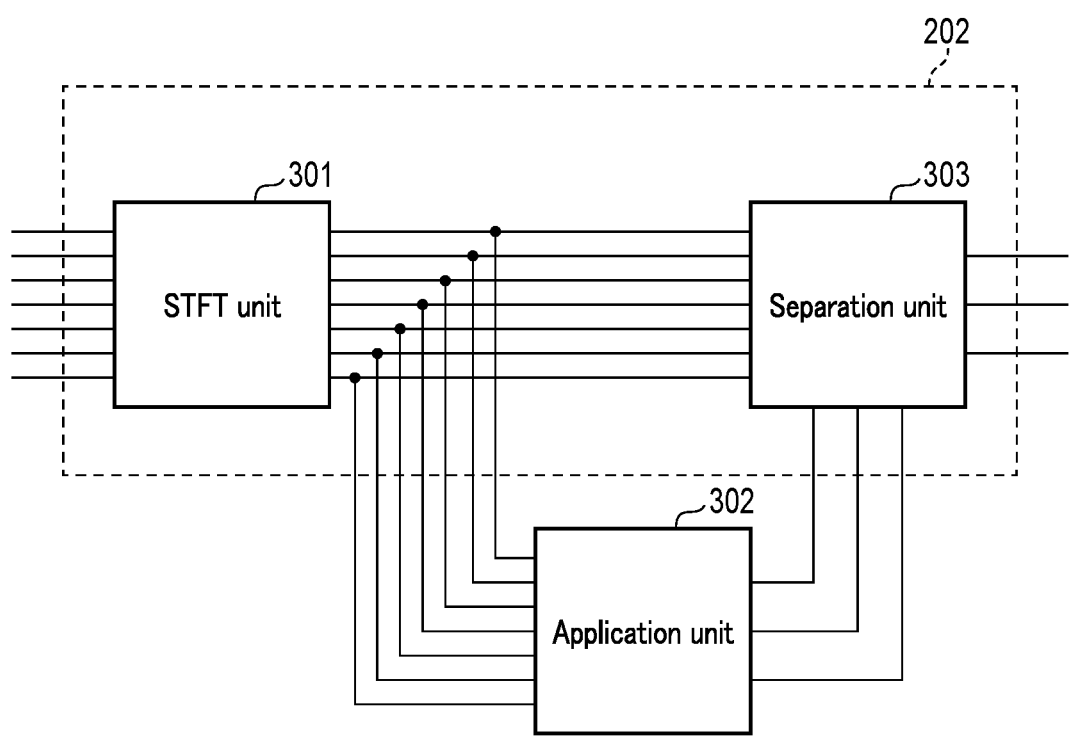
F I G. 5

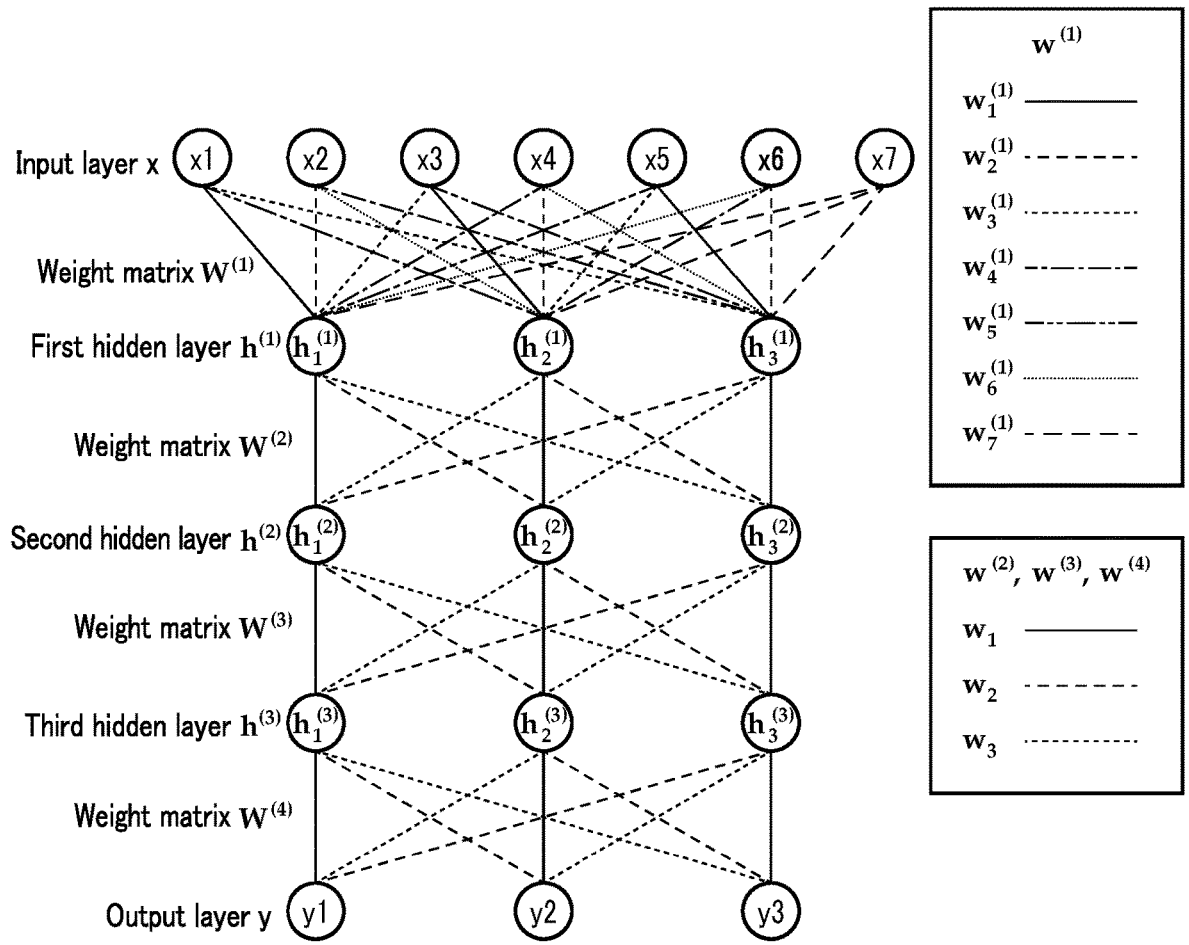
F I G. 6

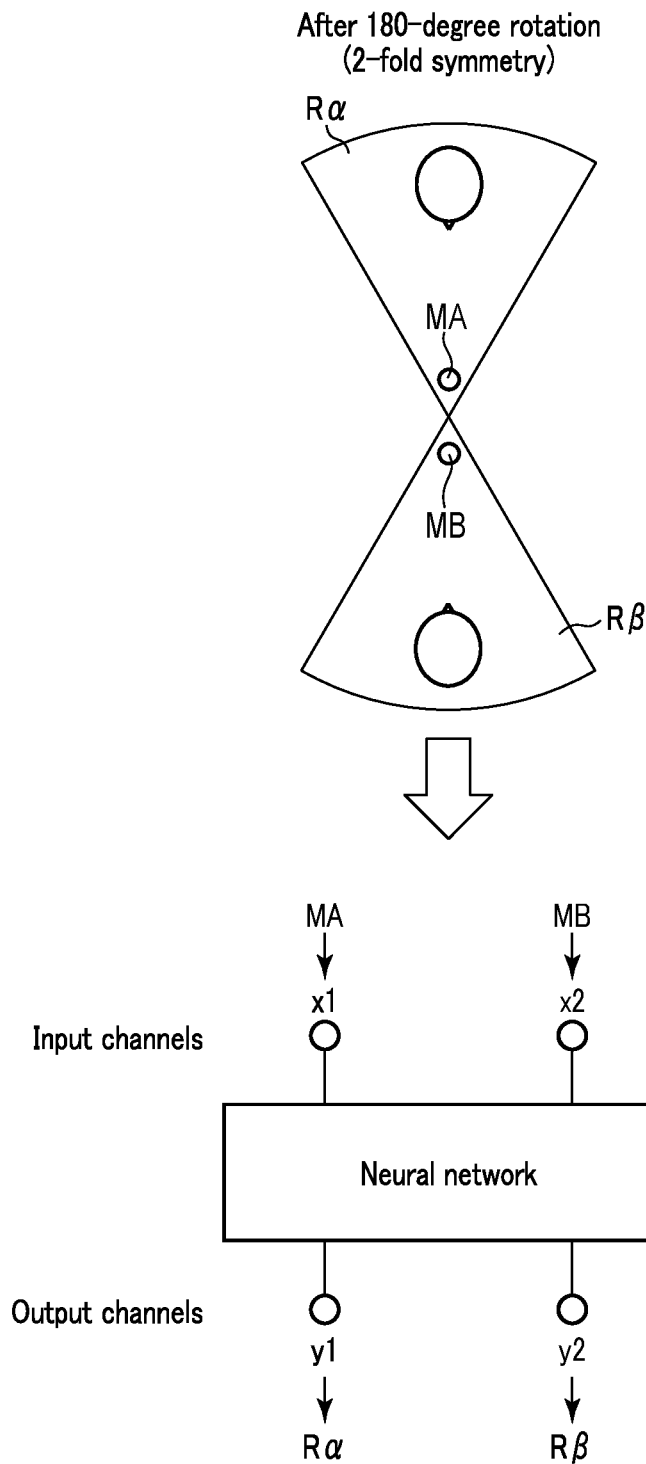
F I G. 10

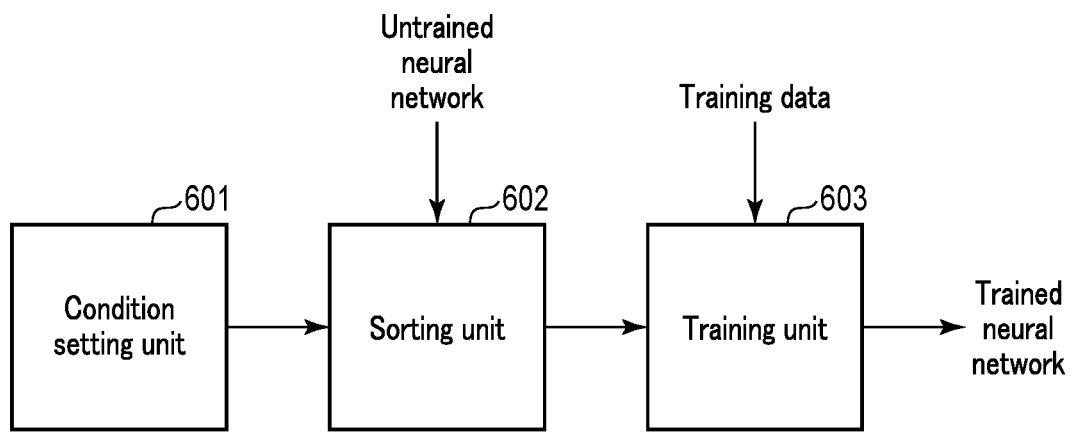
F I G. 13
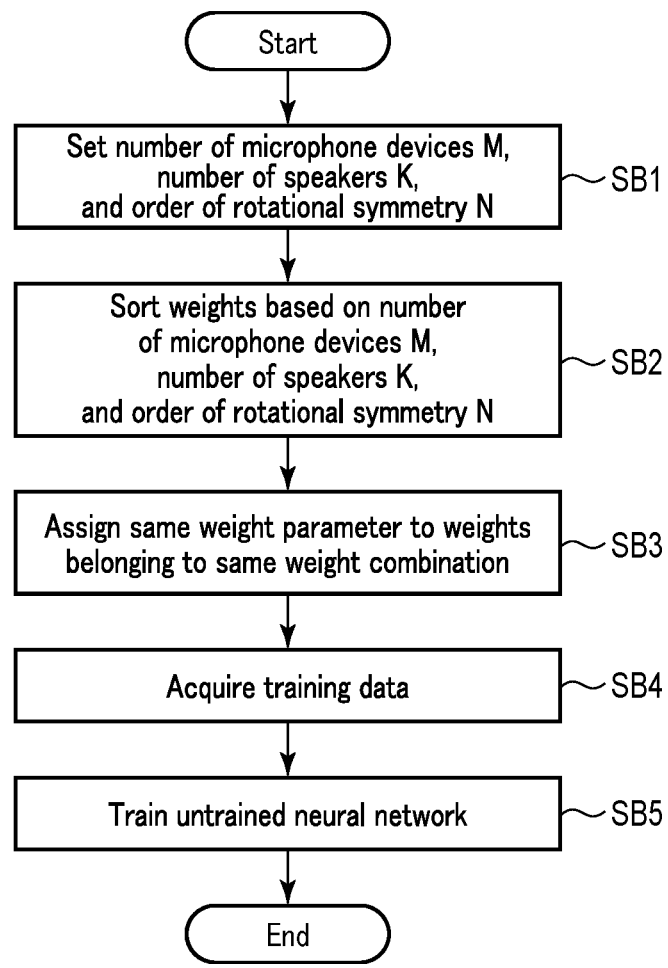
F I G. 14

Initial weight matrix
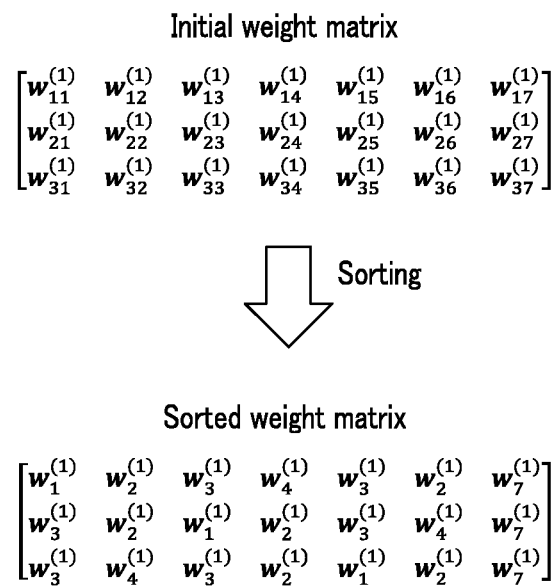
Sorted weight matrix
F I G. 15
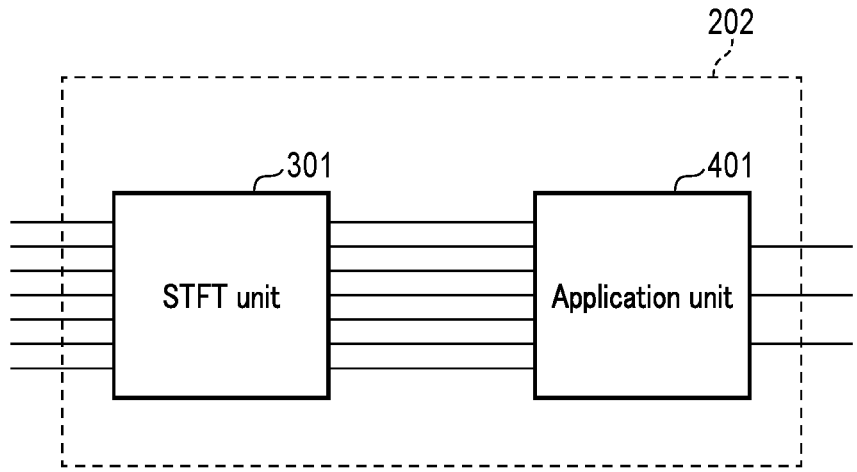
F I G. 16

SIGNAL PROCESSING APPARATUS AND NON-TRANSITORY COMPUTER READABLE MEDIUM

CROSS-REFERENCE TO RELATED APPLICATIONS

This application is based upon and claims the benefit of priority from Japanese Patent Application No. 2020-155629, filed Sep. 16, 2020, the entire contents of which are incorporated herein by reference.

FIELD

Embodiments described herein relate generally to a signal processing apparatus and a non-transitory computer readable medium.

BACKGROUND

A technique of separating signals obtained from various types of detecting devices in accordance with signal sources has been developed. For example, one method is to separate signals detected by multiple microphones into speech of multiple speakers by an independent vector analysis based on arrival directions of the signals. Another method is to separate signals detected by a single microphone into speech of multiple speakers based on characteristics of signal spectra, using a neural network. With the first method, however, it is difficult to determine whether the separated signal is a speech signal or noise and which direction the signal is arriving from, and it is therefore difficult to separate the speech signal of a desired speaker from other signals in a stable manner. With the second method, information relating to direction cannot be used, as the signal separation is performed on single channel signals. For this reason, the accuracy of separation is low, and it is therefore difficult to specify who the speaker of the separated speech signal is.

BRIEF DESCRIPTION OF THE DRAWINGS

FIG. 1 is a diagram of a configuration example of a signal processing apparatus according to a first embodiment.

FIG. 5 is a diagram showing a functional configuration example of a sound source separating unit shown in FIG. 4.

FIG. 6 is a diagram showing a network configuration example of a trained neural network of the first embodiment.

FIG. 10 is a diagram showing a positional relationship between microphone devices and sound source direction ranges in an arrangement in the case where the number of microphone devices M is 2, the number of speakers or sound source direction ranges K is 2, and the rotational symmetry number N is 2, a correspondence between the microphone devices and input vectors, and a correspondence between output vectors and sound source direction ranges.

FIG. 13 is a diagram showing a functional configuration example of the training processing unit of FIG. 1.

FIG. 14 is a diagram showing a flow of training processing by the training processing unit shown in FIG. 1.

FIG. 15 is a schematic diagram showing a determination of weight combinations and setting of weight parameters performed in steps SB2 and SB3 of FIG. 14.

FIG. 16 is a diagram showing a functional configuration example of a sound source separating unit according to Modification 1.

DETAILED DESCRIPTION

Figure 2:
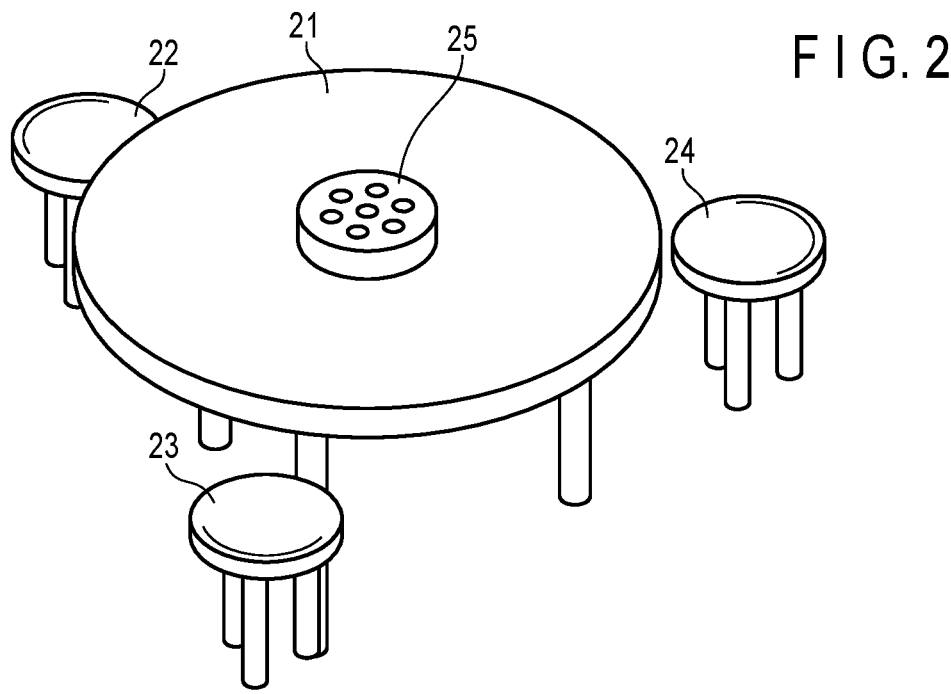
FIG. 2 is an external view of an arrangement of speakers and microphone devices.

In general, according to one embodiment, a signal processing apparatus includes an acquisition unit and an application unit. The acquisition unit acquires M detection signals output from M detectors having N-fold symmetry (M is an integer equal to or greater than 2, and N is an integer equal to or greater than 2). Each of the M detectors detects original signals generated from K signal sources (K is an integer equal to or greater than 2) having the N-fold symmetry. The application unit applies a trained neural network to M input vectors corresponding to the M detection signals and outputs K output vectors. The same parameters are set to, of multiple weights included in a weight matrix of the trained neural network, the weights that are commutative based on the N-fold symmetry.

Hereinafter, a signal processing apparatus and a trained neural network according to the present embodiment will be described with reference to the accompanying drawings.

A signal processing apparatus according to the present embodiment is a computer that performs signal processing relating to signal source separation using a trained neural network (hereinafter, "signal source separation processing"). The signal processing apparatus is a computer that performs signal processing relating to training for generating a trained neural network (hereinafter, "training processing"). In the descriptions hereinafter, a single signal processing apparatus performs both signal source separation processing and training processing; however, the processings may be performed by separate computers. In this case, the computer that performs the signal source separation processing may be called an "inference apparatus", and the computer that performs the training processing may be called a "training apparatus".

FIG. 1 shows a configuration example of a signal processing apparatus 1 according to the present embodiment. As shown in FIG. 1, the signal processing apparatus 1 includes a processing circuit 11, a storage apparatus 12, a detector device 13, an input device 14, a display device 15, and a communication device 16.

The processing circuit 11 has a processor such as a CPU (central processing unit) and a memory such as a RAM (random access memory). The processing circuit 11 realizes an acquisition unit 111, a signal processing unit 113, and an output controlling unit 117, through executing a program stored in the storage apparatus 12. The hardware implementation of the processing circuit 11 is not limited to the above-described aspect. For example, the processing circuit 11 may be constituted by a circuit such as an application specific integrated circuit (ASIC), etc. that realizes the acquisition unit 111, the signal processing unit 113, the training processing unit 115, and the output controlling unit 117. The acquisition unit 111, the signal processing unit 113, and the output controlling unit 117 may be implemented in a single integrated circuit or individually implemented in different integrated circuits.

The acquisition unit 111 acquires various signals. For example, the acquisition unit 111 acquires M detection signals output from M detector devices 13 having N-fold symmetry (M is an integer equal to or greater than 2, and N is an integer equal to or greater than 2).

The signal processing unit 113 performs the signal source separation processing. Specifically, the signal processing unit 113 performs signal processing on M detection signals and generates K speech signals that respectively correspond to K signal sources (K is an integer equal to or greater than 2) and that are separated according to the signal sources (hereinafter, "separated speech signals"). At this time, the signal processing unit 113 applies a trained neural network to M input vectors corresponding to M detection signals and outputs K output vectors, and then generates K separated speech signals based on K output vectors. The trained neural network is a complex neural network.

The training processing unit 114 trains a neural network based on training data and generates a trained neural network. The training processing unit 114 trains parameters of the neural network in such a manner that M input vectors corresponding to M detection signals are input and K output vectors are output.

The output controlling unit 117 controls the output of various types of information. For example, the output controlling unit 117 displays various types of information on the display device 15, or transmits such information to an external apparatus via the communication device 16. The output controlling unit 117 may output various types of information through a speaker device (not shown).

The storage apparatus 12 is constituted by a ROM (read only memory), an HDD (hard disk drive), an SSD (solid state drive), an integrated circuit storage apparatus, etc. The storage apparatus 12 stores results of various computations performed by the processing circuit 11 and various types of programs executed by the processing circuit 11. The storage apparatus 12 also stores a trained neural network. As a trained neural network, weight values of a weight matrix of the trained neural network may be stored.

M detector devices 13 are provided. M detector devices 13 have an arrangement having N-fold symmetry. Each of the M detector devices 13 detects original signals generated from K signal sources having the N-fold symmetry and outputs detection signals corresponding to the detected original signals. The original signal may be any type of signals, for example a speech signal or a radio wave signal.

The input device 14 accepts various instructions from the user. Examples of the input device 14 that can be used include a keyboard, a mouse, various switches, a touch pad, a touch-panel display, and the like. The output signals from the input device 14 are supplied to the processing circuit 11. The input device 14 may be a computer coupled to the processing circuit 11 with or without wires.

The display device 15 displays various types of information. As the display device 15, it is possible to use, for example, a CRT display, a liquid crystal display, an organic EL display, an LED display, a plasma display, or other types of displays known in this technical field.

The communication device 16 is an interface for information communication with an external device coupled to the signal processing apparatus 1 via a network.

Hereinafter, the signal processing apparatus 1 according to the present embodiment is described in detail.

First, the signal source separation processing by the signal processing apparatus 1 will be described. An example of the signal source separation processing that will be described is a case in which a conversation between K speakers is collected by M microphone devices, and speech is separated according to speaker using a trained neural network, speech recognition is performed on separated speech of each speaker, and content of the conversation is recorded in text for each speaker. In other words, in this example, the sound sources are the speakers, the original signals are speech signals, and the detector devices 13 are microphone devices.

FIG. 2 is an external view of an arrangement of the speakers and the microphone devices. As shown in FIG. 2, a round table 21 is arranged in the room, and three chairs 22, 23, and 24 for three speakers are arranged around the round table 21. In the center of the round table 21, a microphone array 25, which is an example of the detector device 13, is arranged. The microphone array 25 is a box equipped with a plurality of microphone devices. In the present example, the microphone array 25 is provided with seven microphone devices MA, MB, MC, MD, ME, MF, and MG. The microphone array 25 is connected with or without wires to the main body of the signal processing apparatus 1. The microphone array 25 and the microphone devices MA, MB, MC, MD, ME, MF, and MG are an example of the detector device 13.

Figure 3:
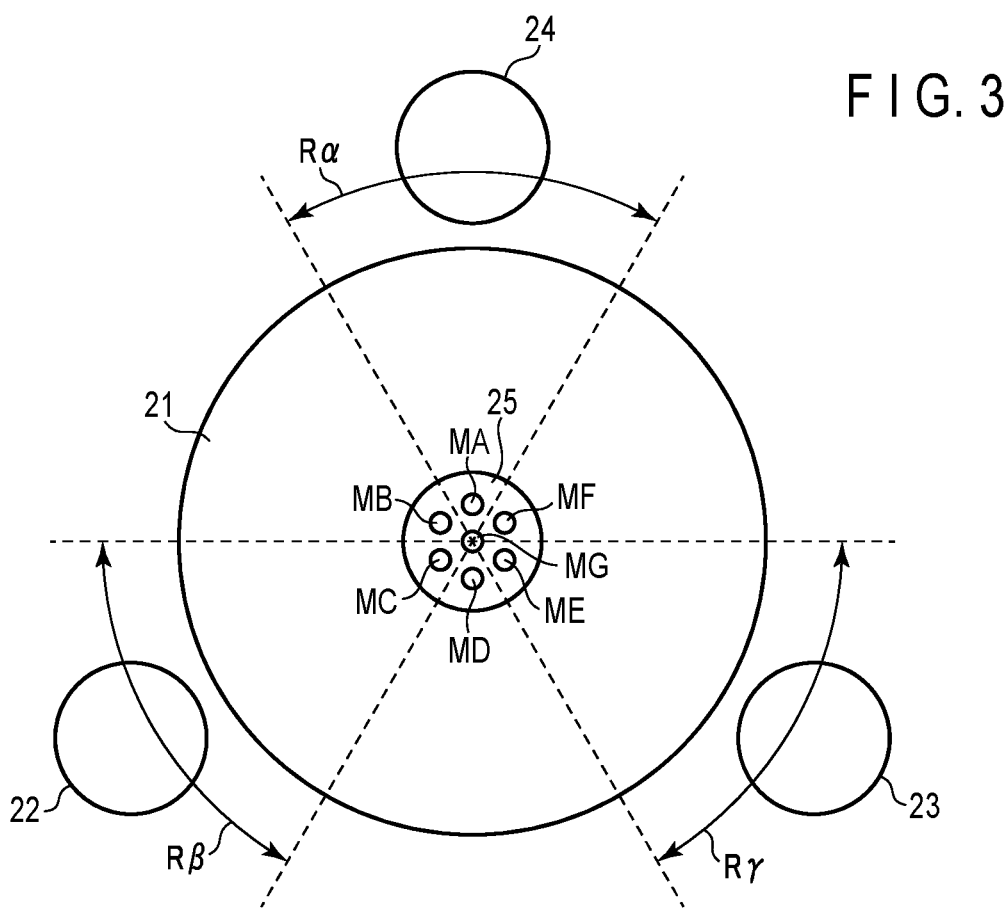
FIG. 3 is a plan view of the arrangement shown in FIG. 2.

FIG. 3 is a plan view of FIG. 2. As shown in FIGS. 2 and 3, a microphone device MG among the seven microphone devices MA, MB, MC, MD, ME, MF, and MG is arranged approximately at the center of the round table 21 and three chairs 22, 23, and 24, and the other microphones MA, MB, MC, MD, ME, and MF are arranged around the microphone device MG at equal intervals. Three speakers sit on three chairs 22, 23, and 24, respectively. Assume that each speaker does not greatly move from the positions of the chairs 22, 23, and 24 they sit on. In this case, each sound source direction range R$\alpha$, R$\beta$, and R$\gamma$ is set within the range of 60 degrees around the center of the microphone array 25, as indicated by the arrows. One speaker sits within each sound source direction range R$\alpha$, R$\beta$, and R$\gamma$. Hereinafter, when there is no need to distinguish the microphone devices MA, MB, MC, MD, ME, MF, and MG, they are simply referred to as "microphone device(s) 13", and when there is no need to distinguish the sound source direction ranges R$\alpha$, R$\beta$, and R$\gamma$, they are simply referred to as "sound source direction range(s) RR".

The sound source direction ranges RR are set in order to perform signal source separation processing. The sound source direction range RR is a spatial range that a trained neural network, which is a complex neural network, regards as an arrival direction of speech sound. In the signal source separation processing using a complex neural network, training is conducted in such a manner that the speech sound that arrives from the sound source direction range RR is processed as an object sound, and the sound that arrives from the outside of the range is processed as non-object sound. It is thereby possible to separate the sounds that concurrently arrive from the sound source direction ranges Rα, Rβ, and Rγ, using a complex neural network.

As shown in FIGS. 2 and 3, the seven microphone devices 13 and the three sound source direction ranges RR are arranged at positions having N-fold symmetry. Specifically, the seven microphone devices 13 and the three sound source direction ranges RR are arranged at commutative positions based on three-fold symmetry with respect to the microphone device MG as a center. An operation of rotating the entire microphone device MG 120 degrees around the center in a clockwise direction is called 120-degree rotation or three-fold symmetry operation. The microphone device MG is not moved as a result of the three-fold symmetry operation; the microphone devices MA, ME, MC, MD, ME, and MF are moved to the positions of the microphone devices ME, MF, MA, MB, MC, and MD respectively, and they are arranged in such a manner that the positions thereof overlap before and after the rotation. With a similar three-fold symmetry operation, the sound source direction ranges Rα, Rβ, and Rγ are moved to the positions of the sound source direction ranges Rγ, Rα, and Rβ respectively, and they are also arranged in such a manner that the positions after the rotation overlap those before the rotation.

Each speaker produces speech sound during conversation. The speech sound may be referred to as an "original signal" or a "speech signal". Each microphone device 13 detects speech sounds produced by each speaker and converts the detected speech sounds into analog electric signals (hereinafter, "detection signals"). The detection signals are supplied to the processing circuit 11 via wires or wirelessly. The detection signals are time-series signals that indicate time-series changes in energy of speech sounds produced by each speaker. The detection signals may be either separated by a predetermined length of time so as to be supplied to signal processing in units of detection signals having a predetermined length of time or supplied to the signal processing without being separated by a predetermined length of time. A conversion method of the microphone device 13 is not limited to any specific method, and may be any method, for example a dynamic type, a condenser type, a crystal type, an electrostriction type, a magnetic type, or a carbon type.

Figure 4:
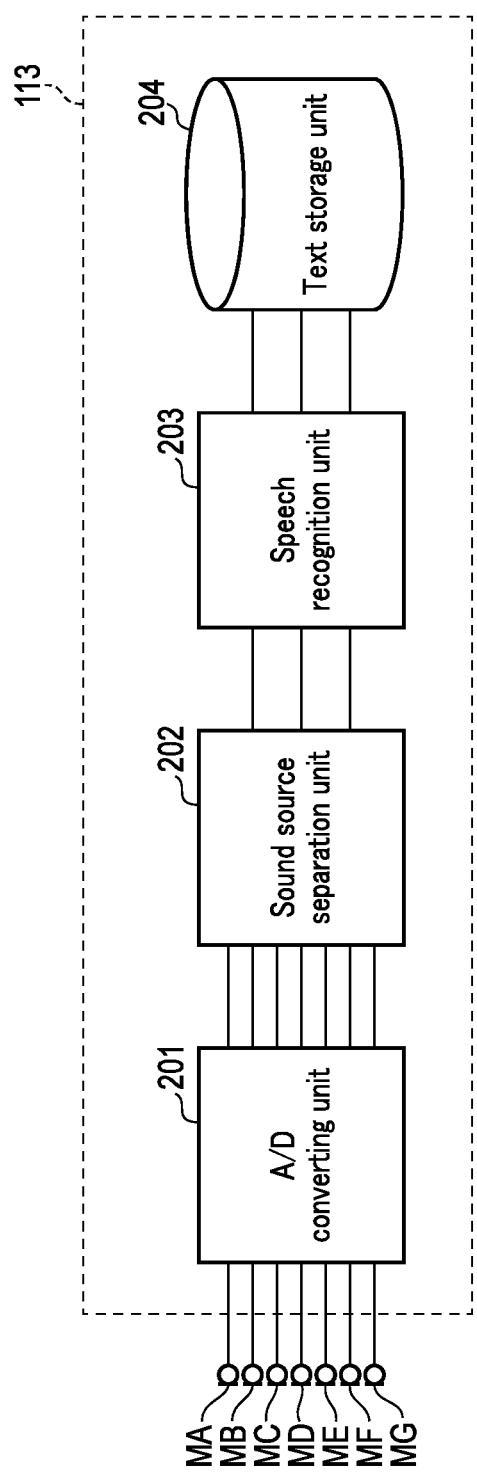
FIG. 4 is a diagram showing a functional configuration example of the signal processing apparatus of FIG. 1.

Next, a functional configuration example of the processing circuit 11 will be described with reference to FIGS. 4 and 5. In FIGS. 4 and 5, assume the number of channels is seven for the microphone devices, and three for the speakers and the sound source direction ranges.

FIG. 4 shows a functional configuration example of the processing circuit 11. As shown in FIG. 4, the signal processing unit 113 includes an A/D converting unit 201, a sound source separating unit 202, a speech recognition unit 203, and a text storage unit 204. For example, the A/D converting unit 201, the sound source separating unit 202, the speech recognition unit 203, and the text storage unit 204 are implemented in the processing circuit 11. The text storage unit 204 may be implemented in the storage apparatus 15.

As shown in FIG. 4, detection signals of seven channels collected by seven microphone devices MA through MG are input into the A/D converting unit 201. The A/D converting unit 201 converts detection signals of seven channels into digital signals and generates digital signals of seven channels. The digital signals of seven channels are input into the sound source separating unit 202. The sound source separating unit 202 separates the digital signals of seven channels into speech signals according to the speakers and outputs a speech spectrum of three channels respectively corresponding to the three speakers. The speech recognition unit 203 performs speech recognition on the speech spectrum of each of the three speakers and outputs text data that describes content of the speech of each speaker. The text storage unit 204 associates the text data with a speaker identifier and stores the text data with the associated speaker identifier. The text data may be displayed on the display device 15 or transferred to the communication device 16, by the processing circuit 11. The text data is referred to as, for example, minutes of a meeting.

FIG. 5 is a diagram showing a functional configuration example of the sound source separating unit 202. As shown in FIG. 5, the sound source separating unit 202 includes a STFT unit 301, an application unit 302, and a separation unit 303. For example, the STFT unit 301, the application unit 302, and the separation unit 303 are implemented in the processing circuit 11.

The STFT unit 301 performs short-term Fourier transform (STFT) on digital signals of seven channels based on a window function and the Fourier transform and outputs a frequency spectrum Xm(f,n) of the seven channels. Herein, f represents the number of a frequency bin, n represents a frame number, and m represents a microphone number. Specifically, the STFT unit 301 divides a digital signal of each channel in units of frames by sliding the signal over time for an amount of frame shift, and applies a window function on the digital signal of each frame and outputs a frequency spectrum Xm(f,n). For example, in the case where the sampling frequency is 16 kHz, and the frame length (window function length) is 256 samples, and the frame shift is 128 samples, the complex number values of 129 points in the range of 0≤f≤128 are output as a frequency spectrum Xm(f,n) of an n-th frame in consideration of the symmetry between a low range and a high range. The seven-dimensional column vector X(f,n) in which frequency spectra of seven channels are put together is expressed as $X(f,n)=[X1(f,n), X2(f,n), \ldots, X7(f,n)]^T$. Herein, T represents transposing of a matrix. X(f,n) is a vector.

The application unit 302 applies the frequency spectrum Xm(f,n) of seven channels to the trained neural network and outputs a frequency mask Mk(f,n) of three channels respectively corresponding to three speakers. Herein, k represents a speaker number. The frequency mask Mk(f,n) is a real number that takes on values in the range of 0≤Mk(f,n)≤1, and it represents a ratio of speech power of a k-th speaker to speech power in a time-frequency point (f,n) of the frequency spectrum Xm(f,n). The trained neural network is trained in such a manner that a frequency mask Mk(f,n) of three channels is output in response to an input of a frequency spectrum Xm(f,n) of seven channels. The trained neural network is stored in the storage apparatus 12, for example.

The separation unit 303 generates a speech spectrum Yk(f,n) of three channels respectively corresponding to the three speakers based on the frequency spectrum Xm(f,n) of seven channels and the frequency mask Mk(f,n) of three channels. More specifically, the separation unit 303 first generates three spatial filters Fk(f,n) respectively corresponding to the three speakers based on the frequency spectrum Xm(f,n) of seven channels and the frequency mask Mk(f,n) of three channels. The spatial filter Fk(f,n) is a spatial filter that emphasizes speech from a specific speaker and suppresses speech from the other speakers and noise.

The spatial filter Fk(f,n) is a seven-dimensional complex vector expressed as Fk(f,n)=[Fk,1(f,n), Fk,2(f,n), ..., Fk,7(f,n)]$^T$.

After the spatial filter Fk(f,n) is generated, the separation unit 303 generates three speech spectra Yk(f,n) respectively corresponding to the three speakers based on the frequency spectrum Xm(f,n) of seven channels and the spatial filters Fk(f,n) of three channels. The speech spectrum Yk(f,n) can be obtained by a product of a complex conjugate transpose of the spatial filter Fk(f,n) and the frequency spectrum Xm(f,n), as shown in expression (1) below.

$$Y_k(f,n) = F_k(f,n)^H X(f,n) \quad (1)$$

The spatial filter Fk(f,n) is obtained from a product of a signal-to-noise ratio maximization beam former Fk$^{SNR}$(f,n) and a post filter Fk$^{POST}$(f,n). Fk$^{SNR}$(f,n) is a scalar and Fk$^{POST}$(f,n) is a vector.

$$F_k(f,n) = F_k^{POST}(f,n) F_k^{SNR}(f,n) \quad (2)$$

The signal-to-noise ratio maximization beam former Fk$^{SNR}$(f,n) is calculated as a characteristic vector corresponding to a maximum characteristic value of a matrix $\Psi k^{-1}(f,n) \Phi k(f,n)$, using a spatial correlation matrix $\Phi k(f,n)$ of a speech spectrum from a speaker k and a spatial correlation matrix $\Psi k(f,n)$ of a signal other than the speech of the speaker k (namely speech of a speaker other than the speaker k and noise). Fk$^{POST}$(f,n) is a filter used to improve sound quality through adjustment of power of each frequency bin. Fk$^{POST}$(f,n) is generated by following expression (3) based on the signal-to-noise ratio maximization beam former Fk$^{SNR}$(f,n) and the spatial phase matrix $\Psi(f,n)$.

$$F_k^{POST}(f,n) = \frac{\sqrt{F_k^{SNR}(f,n)^H \Psi_k(f,n) \Psi_k(f,n) F_k^{SNR}(f,n)/4}}{F_k^{SNR}(f,n)^H \Psi(f,n) F_k^{SNR}(f,n)} \quad (3)$$

The spatial phase matrix $\Phi(f,n)$ can be obtained by expression (4), and the spatial phase matrix $\Psi(f,n)$ can be obtained by expression (5). Herein, αk and αo are forgetting coefficients that satisfy 0<αk, αa<1.

$$\Phi_k(f,n) = \alpha_k \Phi_k(f,n-1) + (1-\alpha_k) M_k(f,n) X(f,n) X(f,n)^H \quad (4)$$

$$\Psi_k(f,n) = \alpha_o \Psi_k(f,n-1) + (1-\alpha_o)(1-M_k(f,n)) X(f,n) X(f,n)^H \quad (5)$$

The separation unit 303 can separate signals by using a Wiener filter. In this case, the sound spectrum Yk(f,n) of a k-th speaker is generated based on the frequency mask Mk(f,n) and the frequency spectrum X7(f,n) of the seventh microphone as indicated by expression (5.5). The method with which a Wiener filter is used can separate the signals with a smaller amount of computation than in the method with which the spatial filter Fk(f,n) is used, if the frequency mask Mk(f,n) is sufficiently accurate.

$$Y_k(f,n) = M_k(f,n) x_7(f,n) \quad (5.5)$$

Next, the trained neural network according to the present embodiment will be explained.

FIG. 6 is a schematic diagram of the trained neural networks according to the present embodiment. As shown in FIG. 6, the trained neural network has an input layer, a plurality of hidden layers, and an output layer. The hidden layers are, for example, a first hidden layer, a second hidden layer, and a third hidden layer. Although a form of connection between the layers of the trained neural network is not limited to a specific form, a full connection is assumed hereinafter.

The input layer has seven input channels. Seven input vectors xm(n) respectively corresponding to seven microphone devices are input into seven input channels, respectively. The output layer has three output channels. From the three output channels, three output vectors y(n) respectively corresponding to three sound source direction ranges are output. The input vector x(n) is defined by expression (6), and the output vector y(n) is defined by expression (8). In expressions below, the subscripts represent channel numbers.

$$x(n) = [x_1(n)^T, x_2(n)^T, \ldots, x_7(n)^T]^T \quad (6)$$

$$x_m(n) = [X_m(0,n), X_m(1,n), \ldots, X_m(128,n)]^T \quad (7)$$

$$y(n) = [y_1(n)^T, y_2(n)^T, y_3(n)^T]^T \quad (8)$$

$$y_k(n) = [M_k(0,n), M_k(1,n), \ldots, M_k(128,n)]^T \quad (9)$$

The input vector x(n) is a 903-dimensional complex vector in which seven 129-dimensional complex vectors each expressing a frequency spectrum of each channel of an n-th frame are connected. The input vector x(n) is a complex spectrum. The output vector y(n) is a 387-dimensional complex vector in which three 129-dimensional complex vectors each expressing a frequency mask of each speaker of an n-th frame are connected.

A weight matrix W$^{(i)}$ is assigned to a connection between the layers. The weight matrix W$^{(1)}$ relating to a connection between the first layer (input layer) and the second layer (first hidden layer) is expressed by a submatrix of expression (17). The weight matrix W$^{(2)}$ relating to a connection between the second layer (first hidden layer) and the third layer (second hidden layer), the weight matrix W$^{(3)}$ relating to a connection between the third layer (second hidden layer) and the fourth layer (third hidden layer), and the weight matrix W$^{(4)}$ relating to a connection between the fourth layer (third hidden layer) and the fifth layer (output layer) are set. In this case, the output vector h$^{(1)}$ from the first hidden layer is calculated by expression (10) based on the input vector x(n) and the weight matrix W$^{(1)}$; the output vector h$^{(2)}$ from the second hidden layer is calculated by expression (11) based on the output vector h$^{(1)}$ and the weight matrix W$^{(2)}$; the output vector h$^{(3)}$ from the third hidden layer is calculated by expression (12) based on the output vector h$^{(2)}$ and the weight matrix W$^{(3)}$; and the output vector y(n) from the output layer is calculated by expression (13) based on the output vector h$^{(3)}$ and the weight matrix W$^{(4)}$. Note that the frame number n is omitted in the following expressions.

$$h^{(1)} = \sigma(abs(W^{(1)} x)) \quad (10)$$

$$h^{(2)} = \sigma(W^{(2)} h^{(1)}) \quad (11)$$

$$h^{(3)} = \sigma(W^{(3)} h^{(2)}) \quad (12)$$

$$y = \sigma(W^{(4)} h^{(3)}) \quad (13)$$

Herein, σ( ) represents a computation of applying a sigmoid function to each element of the vector, and abs( ) represents a computation of applying an absolute value computation to each element of the vector. The vector h$^{(\cdot)}$ is a 384-dimensional vector in which three 128-dimensional vectors h1$^{(\cdot)}$, h2$^{(\cdot)}$, h3$^{(\cdot)}$, which are shown as expressions (14) through (16) below, are connected.

$$h^{(1)} = [h_1^{(1)T}, h_2^{(1)T}, h_3^{(1)T}]^T \quad (14)$$

$$h^{(2)} = [h_1^{(2)T}, h_2^{(2)T}, h_3^{(2)T}]^T \quad (15)$$

$$h^{(3)} = [h_1^{(3)T}, h_2^{(3)T}, h_3^{(3)T}]^T \quad (16)$$

The weight matrix $W^{(1)}$ is expressed by the submatrix of expression (17), and the weight matrix $W^{(2)}$, the weight matrix $W^{(3)}$, and the weight matrix $W^{(4)}$ are expressed by the submatrix of expression (18).

$$W^{(1)} = \begin{bmatrix} w_1^{(1)} & w_2^{(1)} & w_3^{(1)} & w_4^{(1)} & w_5^{(1)} & w_6^{(1)} & w_7^{(1)} \\ w_5^{(1)} & w_6^{(1)} & w_1^{(1)} & w_2^{(1)} & w_3^{(1)} & w_4^{(1)} & w_7^{(1)} \\ w_3^{(1)} & w_4^{(1)} & w_5^{(1)} & w_6^{(1)} & w_1^{(1)} & w_2^{(1)} & w_7^{(1)} \end{bmatrix} \quad (17)$$

$$W^{(i)} = \begin{bmatrix} w_1^{(i)} & w_2^{(i)} & w_3^{(i)} \\ w_3^{(i)} & w_1^{(i)} & w_2^{(i)} \\ w_2^{(i)} & w_3^{(i)} & w_1^{(i)} \end{bmatrix} \quad (18)$$

Each submatrix $W^{(i)}$ (i=1, 2, 3, 4) has (the number of input channels)×(the number of output channels)=7×3 submatrices $W_j^{(i)}$. Each submatrix $w_j^{(i)}$ consists of multiple weights. The first submatrix $w_j^{(i)}$ (j=1, 2, ..., 7) represents a complex matrix of 128×129, the second and third submatrices $w^{(2)}$, $w_j^{(3)}$ (j=1, 2, 3) represent a real matrix of 128×128, and the fourth submatrix $w_j^{(4)}$ (j=1, 2, 3) represents a real matrix of 129×128. Since each matrix element of each submatrix $w_j^{(j)}$ is assigned a weight, hereinafter each matrix element may be simply referred to as a weight if the properties of the submatrix $w_j^{(j)}$ are not focused on as those of a matrix. A weight may be considered a complex number.

In the trained neural network of the present embodiment, the same parameters are set to, of multiple weights included in each weight matrix $W^{(i)}$, the weights that are commutative based on N-fold symmetry. For example, if seven microphone devices are provided and three speakers are present, the weight matrix $w^{(1)}$ has 3×7=21 weights (matrix elements) as shown in expression (17). In this case, those 21 weights can be replaced with seven weight parameters $w_j^{(i)}$ by using the three-fold symmetry of the microphone devices and the speakers. In other words, constraints are imposed on, based on N-fold symmetry, degrees of freedom of weight parameters in the trained neural network of the present embodiment. Sharing the weight parameters in the above-described manner allows reduction of the memory size relating to the storing of the trained neural network. It is further possible to reduce a data amount in training data supplied for training, to reduce an amount of calculation required for training, and in turn to reduce a load of training data collection.

Among multiple weights included in each weight matrix $W^{(i)}$, a combination of the weights that are commutative based on N-fold symmetry (hereinafter, "a weight combination") is determined based on N-fold symmetry of the microphone devices and the speakers or sound source direction ranges. As a weight combination is determined based on the N-fold symmetry, if the correspondence between M microphone devices (M input vectors) and M input channels is changed by rotating the arrangement based on the N-fold symmetry in such a manner that the M microphone devices before and after the rotation overlap, the correspondence between K sound source direction ranges (K output vectors) and K output channels after the rotation is changed from the correspondence before the rotation; however, the K output vectors remain unchanged before and after the rotation. In other words, the weight combination is determined in such a manner that the correspondence between K sound source direction ranges (K output vectors) and K output channels is changed whereas the K output vectors are not changed before and after the rotation. The method of determining a weight combination will be described later.

Next, how K output vectors remain unchanged before and after rotation will be described.

Figure 7:
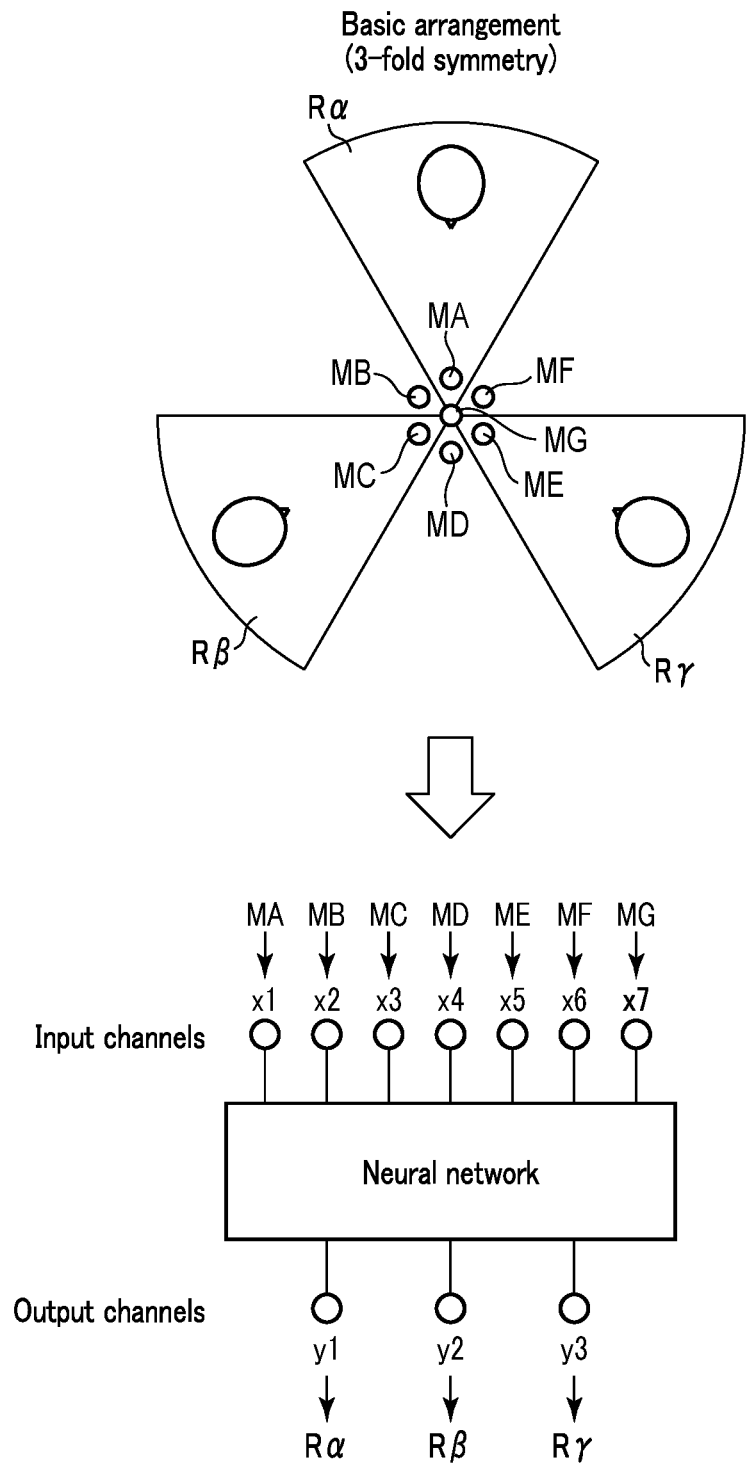
FIG. 7 is a diagram showing a positional relationship between the microphone devices and sound source direction ranges in a basic arrangement, a correspondence between the microphone devices and input vectors, and a correspondence between output vectors and sound source direction ranges.

FIG. 7 is a diagram showing a positional relationship between the microphone devices 13 and sound source direction ranges RR in a basic arrangement, a correspondence between the microphone devices 13 and the input vectors $x_i$, and a correspondence between the output vectors $y_j$ and the sound source direction ranges RR. The basic arrangement is an actual arrangement of the microphone devices 13 and the sound source direction ranges RR. Assume the arrangement is the one shown in FIGS. 2 and 3, for example. In other words, seven microphone devices MA, ..., MG and three sound source direction ranges Rα, Rβ, Rγ are arranged at positions having three-fold symmetry. As shown in Table 1, the microphone devices MA, ..., MG are associated with the input vectors $x_i$, ... $x_7$ respectively, and as shown in Table 2, the output vectors $y_1$, $y_2$, $y_3$ are associated with the sound source direction ranges Rα, Rβ, Rγ respectively.

TABLE 1

| Microphone devices | Input vectors |
| --- | --- |
| MA | $x_1$ |
| MB | $x_2$ |
| MC | $x_3$ |
| MD | $x_4$ |
| ME | $x_5$ |
| MF | $x_6$ |
| MG | $x_7$ |

TABLE 2

| Sound source direction range | Output vector |
| --- | --- |
| Rα | $y_1$ |
| Rβ | $y_2$ |
| Rγ | $y_3$ |

In this case, the output vector $h_1^{(1)}$ from the first channel of the first hidden layer is expressed as expression (19) based on the first row of the weight matrix shown in expression (17), and the output vector $h_2^{(1)}$ from the second channel is expressed as expression (20) based on the second row of the weight matrix shown in expression (17); and the output vector $h_3^{(1)}$ from the third channel is expressed as expression (21) based on the third row of the weight matrix shown in expression (17).

$$h_1^{(1)} = \sigma(abs(w_1^{(1)}x_1 + w_2^{(1)}x_2 + w_3^{(1)}x_3 + w_4^{(1)}x_4 + w_5^{(1)}x_5 + w_6^{(1)}x_{(6)} + w_7^{(1)}x_7)) \quad (19)$$

$$h_2^{(1)} = \sigma(abs(w_5^{(1)}x_1 + w_6^{(1)}x_2 + w_1^{(1)}x_3 + w_2^{(1)}x_4 + w_3^{(1)}x_5 + w_4^{(1)}x_{(6)} + w_7^{(1)}x_7)) \quad (20)$$

$$h_3^{(1)} = \sigma(abs(w_3^{(1)}x_1 + w_4^{(1)}x_2 + w_5^{(1)}x_3 + w_6^{(1)}x_4 + w_1^{(1)}x_5 + w_2^{(1)}x_{(6)} + w_7^{(1)}x_7)) \quad (21)$$

Similarly, the output vectors $h^{(i)}$ from the second and third hidden layers are expressed as expressions (22) through (24), and the output vector y from the output layer is expressed as expressions (25) through (27).

$$h_1^{(i+1)} = \sigma(w_1^{(i+1)}h_1^{(i)} + w_2^{(i+1)}h_2^{(i)} + w_3^{(i+1)}h_3^{(i)}) \quad (22)$$

$$h_2^{(i+1)} = \sigma(w_3^{(i+1)}h_1^{(i)} + w_1^{(i+1)}h_2^{(i)} + w_2^{(i+1)}h_3^{(i)}) \quad (23)$$

$$h_3^{(i+1)} = \sigma(w_2^{(i+1)}h_1^{(i)} + w_3^{(i+1)}h_2^{(i)} + w_1^{(i+1)}h_3^{(i)}) \quad (24)$$

$$y_1 = \sigma(w_1^{(4)} h_1^{(3)} + w_2^{(4)} h_2^{(3)} + w_3^{(4)} h_3^{(3)}) \quad (25)$$

$$y_2 = \sigma(w_3^{(4)} h_1^{(3)} + w_1^{(4)} h_2^{(3)} + w_2^{(4)} h_3^{(3)}) \quad (26)$$

$$y_3 = \sigma(w_2^{(4)} h_1^{(3)} + w_3^{(4)} h_2^{(3)} + w_1^{(4)} h_3^{(3)}) \quad (27)$$

Next, the output vectors in the arrangement after the 120-degree rotation operation performed on the basic arrangement shown in FIG. 7 will be described.

Figure 8:
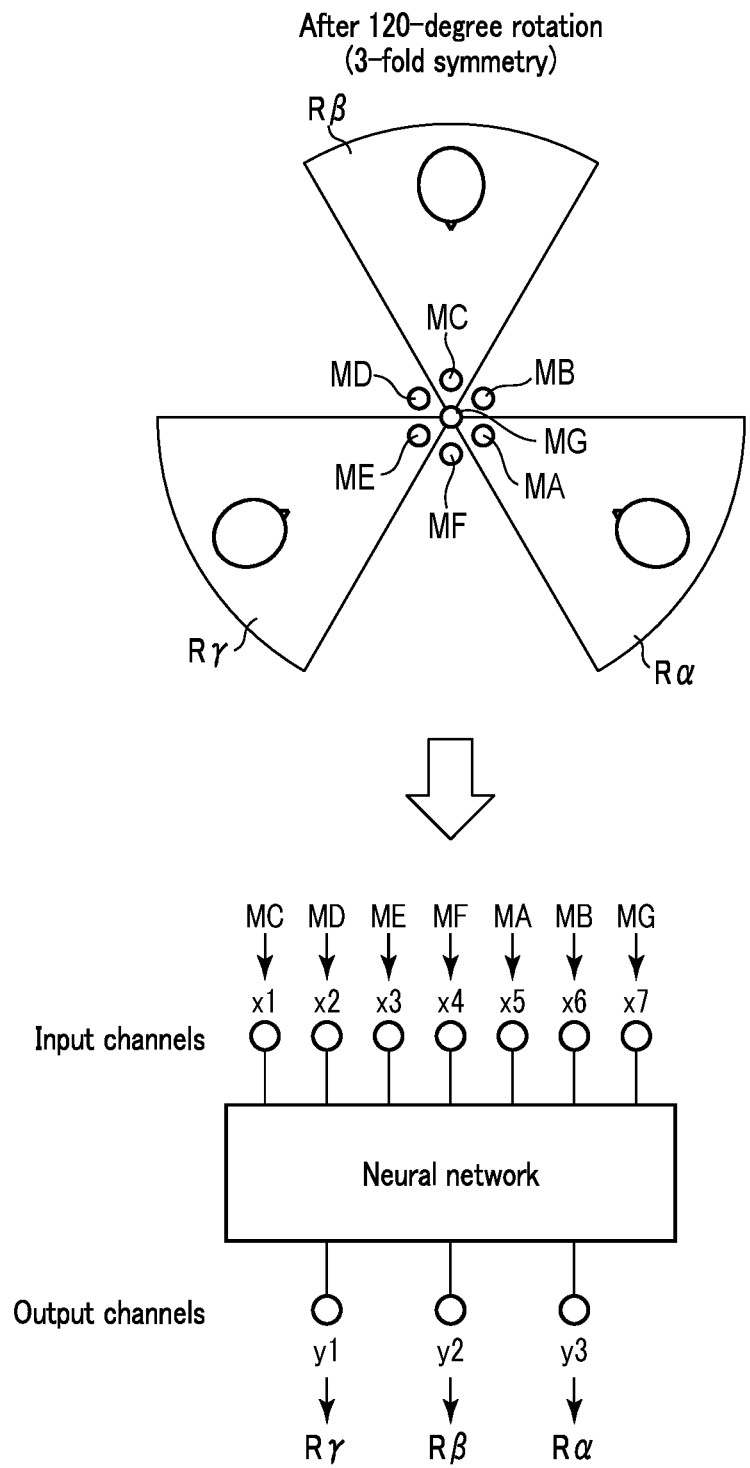
FIG. 8 is a diagram showing, in an arrangement after rotating the basic arrangement shown in FIG. 7 120 degrees, a positional relationship of the microphone devices and the sound source direction ranges, a correspondence between the microphone devices and input vectors, and a correspondence between output vectors and a sound source direction range.

FIG. 8 is a diagram showing a positional relationship of the microphone devices 13 and the sound source direction ranges RR after the basic arrangement shown in FIG. 7 is rotated 120 degrees, a correspondence between the microphone devices 13 and the input vectors $x_i$, and a correspondence between the output vectors $y_j$ and the sound source direction ranges RR. If the arrangement is rotated by 120 degrees around the microphone device MG in a clockwise direction as shown in FIG. 8, the correspondence of the microphone devices before and after the rotation located at the same positions is as shown in Table 3. The input vectors $x_1, x_2, x_3, x_4, x_5, x_6$, and $x_7$ are associated with the microphone devices MC, MD, ME, MF, MA, MB, and MG respectively, and the output vectors $y_1, y_2$, and $y_3$ are associated with the sound source direction ranges R$\gamma$, R$\beta$, and R$\alpha$ respectively.

TABLE 3

| Before rotation | After rotation |
| --- | --- |
| MA | MC |
| MB | MD |
| MC | ME |
| MD | MF |
| ME | MA |
| MF | MB |
| MG | MG |

The input vector $x' = [x_1'^T, x_2'^T, \ldots, x_7'^T]$ obtained from the signals detected by the microphone array 25 after the rotation is equal to the input vectors obtained by changing the correspondence between the microphone devices 13 and the input vectors in the basic arrangement to those shown in Table 4.

TABLE 4

| Microphone devices | Input vectors |
| --- | --- |
| ME | $x_1'$ |
| MF | $x_2'$ |
| MA | $x_3'$ |
| MB | $x_4'$ |
| MC | $x_5'$ |
| MD | $x_6'$ |
| MG | $x_7'$ |

The correspondence shown in Table 4 is obtained by replacing the microphone devices 13 of Table 1 with those listed as "after rotation" in Table 3. The input vector x' input to the input layer after the 120-degree rotation operation is expressed by expression (28) based on Table 1 and Table 4.

$$x' = [x_5^T, x_6^T, x_1^T, x_2^T, x_3^T, x_4^T, x_7^T]^T \quad (28)$$

The output vector $h'^{(1)}$ from the first hidden layer after the 120-degree rotation operation is expressed by expressions (29) through (32) based on the input vector x' and the weight matrix $W^{(1)}$ shown in expression (17).

$$h'^{(1)} = \sigma(\mathrm{abs}(W^{(1)} x')) \quad (29)$$

$$h_1'^{(1)} = \sigma(\mathrm{abs}(w_1^{(1)} x_5 + w_2^{(1)} x_6 + w_3^{(1)} x_1 + w_4^{(1)} x_2 + w_5^{(1)} x_3 + w_6^{(1)} x_4 + w_7^{(1)} x_7)) \quad (30)$$

$$h_2'^{(1)} = \sigma(\mathrm{abs}(w_5^{(1)} x_5 + w_6^{(1)} x_6 + w_1^{(1)} x_1 + w_2^{(1)} x_2 + w_3^{(1)} x_3 + w_4^{(1)} x_4 + w_7^{(1)} x_7)) \quad (31)$$

$$h_3'^{(1)} = \sigma(\mathrm{abs}(w_3^{(1)} x_5 + w_4^{(1)} x_6 + w_5^{(1)} x_1 + w_6^{(1)} x_2 + w_1^{(1)} x_3 + w_2^{(1)} x_4 + w_7^{(1)} x_7)) \quad (32)$$

If expressions (19) through (21) are compared with expressions (30) through (32), the correspondences between the output vector $h^{(1)}$ from the first hidden layer in the basic arrangement and the output vector $h'^{(1)}$ from the first hidden layer after the 120-degrees rotation operation are expressed by expressions (33) through (35). In other words, the output vector $h_1'^{(1)}$ corresponds to the output vector $h_3^{(1)}$, and the output $h_2'^{(1)}$ corresponds to the output vector $h_1^{(1)}$, and the output vector $h_3'^{(1)}$ corresponds to the output vector $h_2^{(1)}$.

$$h_1'^{(1)} = h_3^{(1)} \quad (33)$$

$$h_2'^{(1)} = h_1^{(1)} \quad (34)$$

$$h_3'^{(1)} = h_2^{(1)} \quad (35)$$

Using the above relationships, the output vectors from the second hidden layer $h'^{(2)}$ can be obtained as shown in expressions (36) through (39).

$$h'^{(2)} = \sigma(W^{(2)} h'^{(1)}) \quad (36)$$

$$h_1'^{(2)} = \sigma(w_1^{(2)} h_3^{(1)} + w_2^{(2)} h_1^{(1)} + w_3^{(2)} h_2^{(1)}) \quad (37)$$

$$h_2'^{(2)} = \sigma(w_3^{(2)} h_3^{(1)} + w_1^{(2)} h_1^{(1)} + w_2^{(2)} h_2^{(1)}) \quad (38)$$

$$h_3'^{(2)} = \sigma(w_2^{(2)} h_3^{(1)} + w_3^{(2)} h_1^{(1)} + w_1^{(2)} h_2^{(1)}) \quad (39)$$

If expressions (22) through (24) are compared with expressions (37) through (39), the correspondences between the output vector $h^{(1)}$ from the second hidden layer in the basic arrangement and the output vector $h'^{(1)}$ from the first hidden layer after the 120-degrees rotation operation are expressed by expressions (40) through (42). In other words, the output vector $h_1'^{(2)}$ corresponds to the output vector $h_3^{(2)}$, the output vector $h_2'^{(2)}$ corresponds to the output vector $h_1^{(2)}$, and the output vector $h_3'^{(2)}$ corresponds to the output vector $h_2^{(2)}$.

$$h_1'^{(2)} = h_3^{(2)} \quad (40)$$

$$h_2'^{(2)} = h_1^{(2)} \quad (41)$$

$$h_3'^{(2)} = h_2^{(2)} \quad (42)$$

Hereinafter, if the forward propagation calculation is performed in a similar manner, the correspondences between the output vectors from the output layer in the basic arrangement, $y = [y_1^T, y_2^T, y_3^T]^T$, and the output vectors from the output layer after the 120-degree rotation operation, $y' = [y_1'^T, y_2'^T, y_3'^T]^T$, are expressed by expressions (43) through (45).

$$y_1' = y_3 \quad (43)$$

$$y_2' = y_1 \quad (44)$$

$$y_3' = y_2 \quad (45)$$

In other words, the output vector $y_1'$ corresponds to the output vector $y_3$, the output vector $y_2'$ corresponds to the output vector $y_1$, and the output vector $y_3'$ corresponds to the output vector $y_2$. The frequency masks obtained by the output vectors y' remain the same as those before the correspondences are changed; however, the correspondence between the obtained frequency masks and the sound source direction ranges is changed. In this changed correspondence, as shown in Table 5 below, the sound source direction ranges are rotated in a clockwise manner 120 degrees, compared to the correspondences listed in Table 2.

TABLE 5

| Sound source direction range | Output vector |
|---|---|
| Rγ | y'₁ |
| Rα | y'₂ |
| Rβ | y'₃ |

The above-described characteristics are desirable in view of the rotational symmetry suitable for the sound source separation processing, and even a regular, fully connected network can achieve the characteristics through learning a sufficient amount of training data. In the present embodiment, the above-described rotational symmetry is guaranteed by adding constraints to a weight matrix, and the constraints lead to reduction in the number of weight parameters in a weight matrix and, in turn, to reduction in an amount of memory usage in the training processing and the sound source separation processing. The number of weight parameters in a neural network having three-fold symmetry according to the present embodiment is 128×129×2×7+128×128×3+128×128×3+129×128×3=379008, and the number of weight parameters in a regular, fully connected network having no rotational symmetry is 903×384×2+384×384+384×384+384×387=1137024; thus, the number of weight parameters can be reduced to ⅓.

The basic arrangement shown in FIG. 7 has a rotational symmetry other than three-fold symmetry. If a weight matrix that satisfies multiple rotational symmetries is set, the number of weight parameters can be further reduced. For example, the basic arrangement shown in FIG. 7 has two-fold symmetry having the line passing the microphone devices 131 and 134 as a rotation axis, in addition to three-fold symmetry. An operation of rotating the arrangement 180 degrees around the rotation axis in a clockwise direction is called 180-degree rotation or two-fold symmetry operation. Two-fold symmetry is sometimes called mirror symmetry.

FIG. 8 is a diagram showing a positional relationship of the microphone devices 13 and the sound source direction ranges RR in an arrangement after the basic arrangement shown in FIG. 6 is rotated 180 degrees, a correspondence between the microphone devices 13 and the input vectors x, and a correspondence between output vectors $y_j$ and sound source direction ranges RR. As shown in FIG. 8, as the correspondences of the microphone devices located at the same positions before and after the 180-degree rotation operation, the microphone devices MA, MF, ME, MD, MC, ME, and MG are associated with the input vectors $x_1, \ldots x_7$ respectively, and the output vectors $y_1, y_2, y_3$ are associated with the sound source direction ranges Rα, Rβ, Rγ respectively.

A weight matrix that realizes a neural network that satisfies both three-fold symmetry and two-fold symmetry at the same time is expressed by expressions (46) and (47).

$$W^{(1)} = \begin{bmatrix} w_1^{(1)} & w_2^{(1)} & w_3^{(1)} & w_4^{(1)} & w_3^{(1)} & w_2^{(1)} & w_7^{(1)} \\ w_3^{(1)} & w_2^{(1)} & w_1^{(1)} & w_2^{(1)} & w_3^{(1)} & w_4^{(1)} & w_7^{(1)} \\ w_3^{(1)} & w_4^{(1)} & w_3^{(1)} & w_2^{(1)} & w_1^{(1)} & w_2^{(1)} & w_7^{(1)} \end{bmatrix} \quad (46)$$

$$W^{(i)} = \begin{bmatrix} w_1^{(i)} & w_2^{(i)} & w_2^{(i)} \\ w_2^{(i)} & w_1^{(i)} & w_2^{(i)} \\ w_2^{(i)} & w_2^{(i)} & w_1^{(i)} \end{bmatrix} \quad (47)$$

Expression (46) is based on expression (17) wherein $w_6^{(1)}$ is substituted by $w_2^{(1)}$, and $W_5^{(1)}$ is substituted by $w_3^{(1)}$, and expression (47) is based on expression (18) wherein $w_3^{(i)}$ is substituted by $w_2^{(i)}$; therefore, the weight matrix satisfies both two-fold symmetry and three-fold symmetry at the same time.

The correspondence of the microphone devices 13 located at the same positions before and after the 180-degree rotation operation is shown in Table 6.

TABLE 6

| Before rotation | After rotation |
|---|---|
| MA | MA |
| MB | MF |
| MC | ME |
| MD | MD |
| ME | MC |
| MF | MB |
| MG | MG |

The input vector $x'=[x_1'^T, x_2'^T, \ldots, x_7'^T]$ obtained from the signals detected by the microphone array 25 after the rotation is equal to the input vectors obtained by changing the correspondences between the microphone devices 13 and the input vectors at the positions before the rotation to those shown in Table 7. The correspondences shown in Table 7 are obtained by replacing the microphone devices 13 of Table 1 with those listed as "after rotation" in Table 6.

TABLE 7

| Microphone devices | Input vectors |
|---|---|
| MA | x₁' |
| MF | x₂' |
| ME | x₃' |
| MD | x₄' |
| MC | x₅' |
| MB | x₆' |
| MG | x₇' |

The input vector x' input to the input layer is expressed by expression (48) based on Table 1 and Table 7.

$$x'=[x_1^T, x_6^T, x_5^T, x_4^T, x_3^T, x_2^T, x_7^T]^T \quad (48)$$

Similarly to the above-described three-fold symmetry, if the forward propagation calculation is performed on the input vectors x' from the input layer to the output layer in a sequential manner, the output vector y' from each output layer after the 180-degree rotation operation can be obtained by following expressions (49) through (51).

$$y'_1=y_1 \quad (49)$$

$$y'_2=y_3 \quad (50)$$

$$y'_3=y_2 \quad (51)$$

In other words, the output vector $y_1'$ corresponds to the output vector $y_1$, and the output vector $y_2'$ corresponds to the output vector $y_3$, and the output vector $y_3'$ corresponds to the output vector $y_2$. In other words, the frequency masks obtained by the output vectors y' remain the same as those before the correspondence is changed; however, the correspondence between the obtained frequency masks and the sound source direction ranges is changed. In this changed correspondence, as shown in Table 8 below, the sound source direction ranges are rotated 180 degrees, compared to the correspondence listed in Table 2.

TABLE 8

| Sound source direction range | Output vector |
| --- | --- |
| Rα | y'$_1$ |
| Rγ | y'$_2$ |
| Rβ | y'$_3$ |

The number of weight parameters in a neural network having two-fold symmetry and three-fold symmetry according to the present embodiment is 128×129×2×5+128×128×2+128×128×2+129×128×2=263680; thus, the number of weight parameters can be reduced to ¼, compared to the number of weight parameters in a regular, fully connected network having no rotational symmetry.

As described above, it can be presumed that, in the trained neural network according to the present embodiment on which the constraints regarding the degree of freedom are imposed, if the correspondence between M input vectors and M input channels is changed by rotating the arrangement based on the N-fold symmetry in such a manner that the M microphone devices overlap, the correspondence between K output vectors and K output channels is changed before and after the rotation, whereas the K output vectors remain unchanged before and after the rotation. Thus, it can be presumed that a trained neural network can operate normally even when the constraints are imposed on the degree of freedom.

In the foregoing example, the number of microphone devices M is 7, and the number of speakers or sound source direction ranges K is 3. However, these numbers in the present embodiment are not limited to those in the foregoing example if the arrangement having N-fold symmetry is possible. If simultaneous speaking is conducted, it is preferable that the number of microphone devices be greater than the number of speakers or the number of sound source direction ranges.

Next, the case where the number of microphone devices M is 2 and the number of speakers or the number of sound source direction ranges K is 2 will be described. FIG. 10 is a diagram showing a positional relationship between the microphone devices and the sound source direction ranges, a correspondence between the microphone devices and the input vectors, and a correspondence between the output vectors and the sound source direction ranges in an arrangement in the case where the number of the microphone devices M is 2, the number of the speakers or the number of the sound source direction ranges K is 2, and the rotational symmetry number N is 2. In the arrangement shown in FIG. 10, a case where two speakers have a face-to-face conversation is assumed. Two sound source direction ranges Rα and Rβ are arranged facing each other in correspondence to two speakers. Two microphone devices MA and MB are arranged between two speakers. Two microphone devices MA and MB and two speakers or the sound source direction ranges Rα and Rβ have two-fold symmetry defined by the perpendicular bisector of the line segment connecting the microphone devices MA and MB as a rotation axis. The microphone devices MA and MB correspond to the input vectors $x_1$ and $x_2$ respectively, and the sound source direction ranges Rα and Rβ correspond to the input vectors $y_1$ and $y_2$ respectively.

Even in the arrangement shown in FIG. 10, the number of weight parameters can be reduced based on two-fold symmetry, similarly to the basic arrangement as described above. The neural network having two-fold symmetry based on the arrangement shown in FIG. 10 can reduce the number of weight parameters to half of that in the fully connected network having no N-fold symmetry.

The weight combinations to which the same weight parameters are assigned differ between combinations of the number of microphone devices M, the number of speakers (sound source direction ranges) K, and the order of rotational symmetry N (hereinafter, "arrangement combination"). Thus, it is desirable if a trained neural network is generated and stored in the storage apparatus 12 for each arrangement combination.

Figure 9:
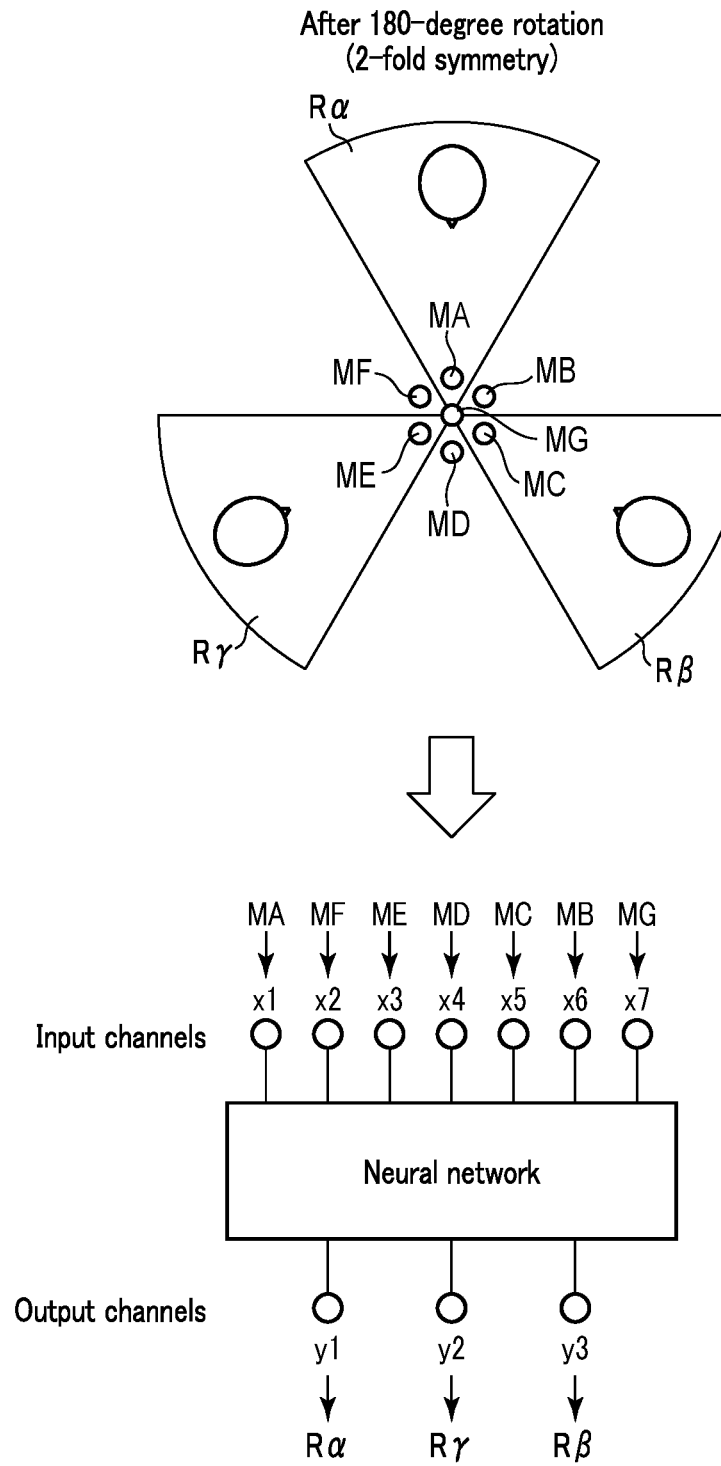
FIG. 9 is a diagram showing, in an arrangement after rotating the basic arrangement shown in FIG. 7 120 degrees, a positional relationship between the microphone devices and sound source direction ranges, a correspondence between the microphone devices and input vectors, and a correspondence between output vectors and sound source direction ranges.
Figure 11:
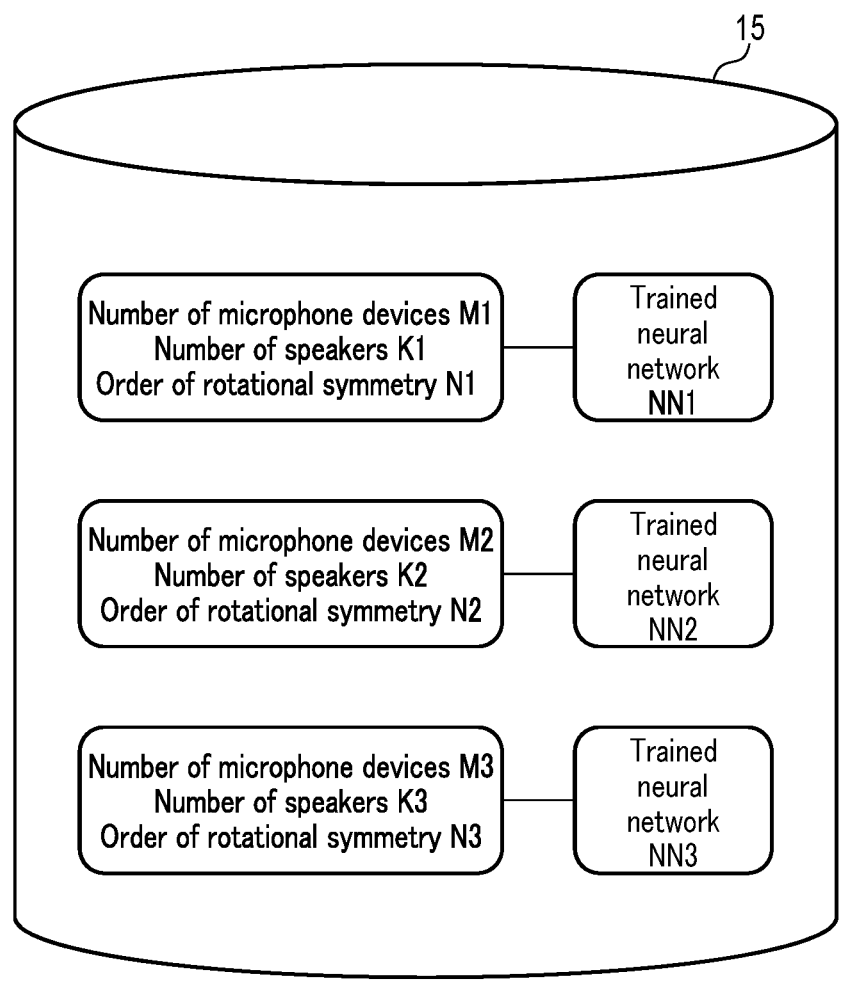
FIG. 11 is a schematic diagram of combinations between trained neural networks and the arrangement combinations.

FIG. 11 is a schematic diagram of correspondences between the trained neural networks NN and the arrangement combinations. As shown in FIG. 11, a trained neural network NN is generated for each arrangement combination of the number of microphone devices M, the number of speakers K, and the order of rotational symmetry N. The trained neural network NN is associated with an arrangement combination of the number of microphone devices M, the number of speakers K, and the order of rotational symmetry N and then stored in the storage apparatus 12. As the order of rotational symmetry N, not only the number of rotations of rotational symmetry, such as two-fold symmetry or three-fold symmetry, but types of symmetry elements, such as a rotational center point or a rotational center axis, may also be set. For example, in the case of three-fold symmetry as shown in FIG. 8, etc., the order of rotational symmetry "3" and the rotational center point are set to the microphone device MG, etc., and in the case of two-fold symmetry as shown in FIG. 9, etc., the order of rotational symmetry "2" and the rotation axis are set to, for example, a straight line connecting the microphone devices MA and MD. As shown in FIG. 11, the trained neural network NN1 is associated with the arrangement combination of the number of microphone devices M1, the number of speakers K1, and the order of rotational symmetry N1, and then stored in the storage apparatus 12; the trained neural network NN2 is associated with the arrangement combination of the number of microphone devices M2, the number of speakers K2, and the order of rotational symmetry N2 and then stored in the storage apparatus 12; and the trained neural network NN3 is associated with the arrangement combination of the number of microphone devices M3, the number of speakers K3, and the order of rotational symmetry N3 and then stored in the storage apparatus 12.

Next, an operation example of the sound source separation processing by the signal processing apparatus 1 will be described.

Figure 12:
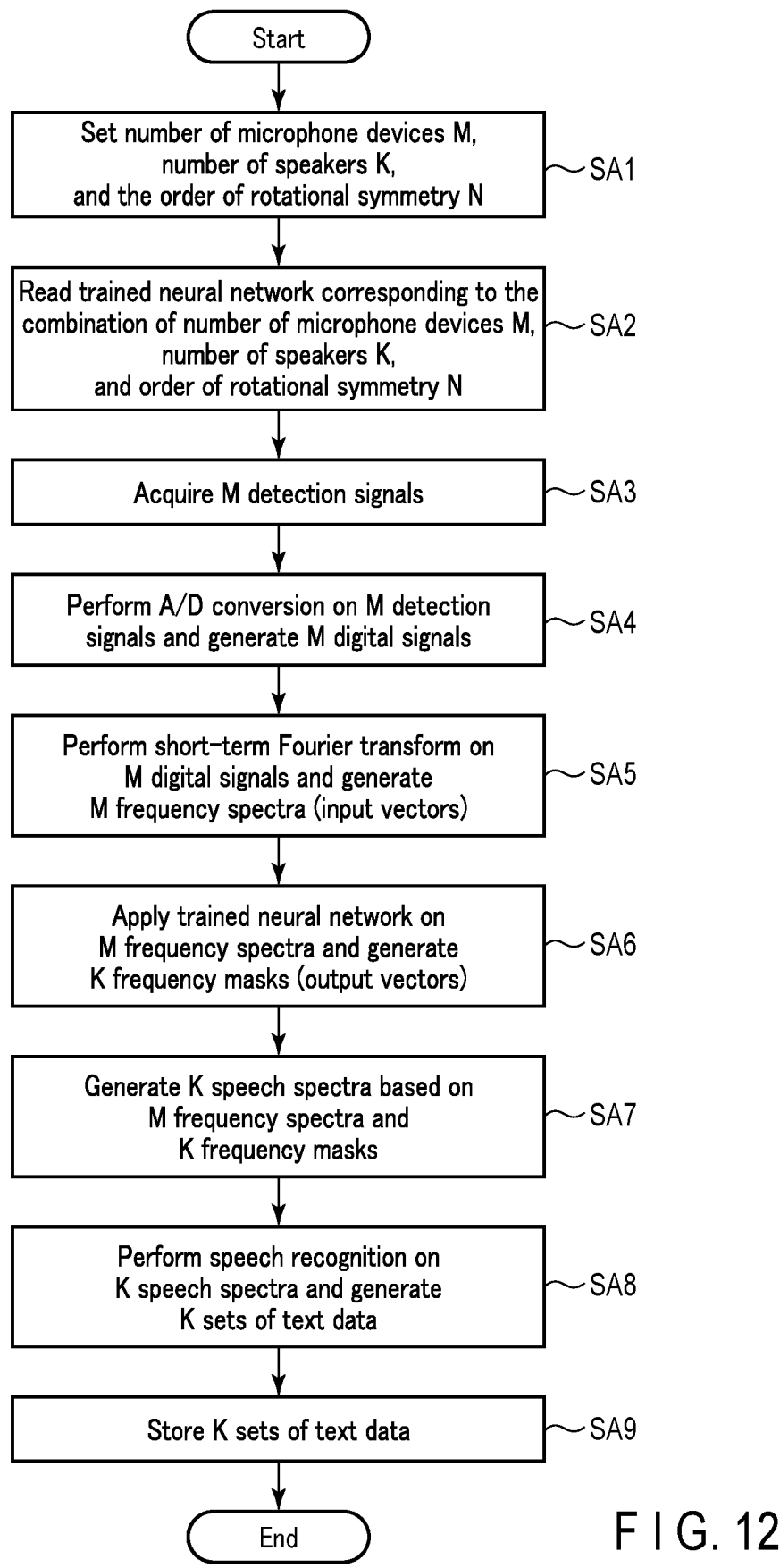
FIG. 12 is a diagram showing an example of a flow of the sound separation processing by the signal processing apparatus of FIG. 1.

FIG. 12 is a diagram showing an example of a flow of the sound source separation processing by the signal processing apparatus of FIG. 1. At the start time in FIG. 12, assume that K speakers (persons) are present and M microphone devices are arranged at positions having N-fold symmetry, and a conversation to be provided to the sound source separation processing has not yet occurred. The processing circuit 11 reads a program relating to the sound source separation processing from the storage apparatus 12 and executes the program to perform the sound source separation processing.

As shown in FIG. 12, the signal processing unit 113 sets the number of microphone devices M, the number of speakers K, and the order of rotational symmetry N (step SA1). The number of microphone devices M, the number of speakers K, and the order of rotational symmetry N are input by a speaker for example, via the input device 14.

After step SA1, the signal processing unit 113 reads a trained neural network corresponding to the number of microphone devices M, the number of speakers K, and the order of rotational symmetry N that have been set in step SA1 (step SA2). In step SA2, the signal processing unit 113 searches the storage apparatus 12 using an arrangement combination of the number of microphone devices M, the number of speakers K, and the order of rotational symmetry N as a search key, and reads a trained neural network associated with the search key from the storage apparatus 12.

After step SA2, K speakers start a conversation. As the conversation between K speakers proceeds, time-series original speech signals are generated. Each of the M microphone devices 13 detects a time-series original speech signal and generates detection signals.

After step SA2, the acquisition unit 111 acquires M detection signals (step SA3). In step SA3, the acquisition unit 111 obtains M detection signals in a real-time manner via M microphone devices 13. After step SA3, the A/D converting unit 201 performs A/D conversion on the M detection signals obtained in step SA3 and generates M digital signals (step SA4). After step SA4, the STFT unit 301 performs short-term Fourier transform on the M digital signals generated in step SA4 and generates M frequency spectra (step SA5).

After step SA5, the application unit 302 applies the trained neural network read in step SA2 to the M frequency spectra generated in step SA5 and generates K frequency masks (step SA6). After step SA6, the separation unit 303 generates K speech spectra based on the M frequency spectra generated in step SA5 and the K frequency masks generated in step SA6 (step SA7). After step SA7, the speech recognition unit 203 performs speech recognition on the K speech spectra generated in step SA7 and generates K sets of text data (step SA8). After step SA8, the speech recognition unit 204 stores K sets of text data generated in step SA8 (step SA9). The K sets of text data generated in step SA8 may be displayed on the display device 15 by the output controlling unit 117 or may be converted into speech sound and output via a speaker device.

The signal source separation processing according to the present embodiment is thus finished.

The flow of the signal source separation processing shown in FIG. 12 is merely an example and is not limited to the example shown in FIG. 12. For example, a plurality of signal processing apparatuses 1 may be provided, and a plurality of trained neural networks having different arrangement combinations of the number of microphone devices M, the number of speakers K, and the order of rotational symmetry N may be stored in the plurality of signal processing apparatuses 1. In this case, steps SA1 and SA2 can be omitted. K sets of text data may be displayed on the display device 15 or transferred to an external device by the communication device 16, without being stored in the storage apparatus 12. K speech spectra may be stored in the storage apparatus 12, or K speech spectra may be output via a speaker device. In this case, step SA8 of generating text data and step SA9 of storing of text data are not necessarily performed.

Next, the training of a trained neural network by the training processing unit 114 will be described.

FIG. 13 shows a functional configuration example of the training processing unit 114. As shown in FIG. 13, the training processing unit 114 includes a condition setting unit 501, a sorting unit 602, and a training unit 603.

The condition setting unit 601 sets conditions relating to the training of a neural network (hereinafter, "training conditions"). The training conditions according to the present embodiment include the number of microphone devices M, the number of speakers K, and the order of rotational symmetry N. As other training conditions, any kinds of conditions that are configurable when training of a neural network is conducted can be set, such as a loss function, an optimization method, a regularization function, a training coefficient, the number of layers, and the number of nodes.

The sorting unit 602 determines a combination of commutative weights (weight combination), among the plurality of weights included in a weight matrix of an untrained neural network, in terms of the symmetrical operation based on N-fold symmetry based on the number of microphone devices M, the number of speakers K, and the order of rotational symmetry N.

The training processing unit 603 assigns the same parameters to multiple weights belonging to the same weight combination and trains an untrained neural network based on training data, and generates a trained neural network. The trained neural network is stored in the storage apparatus 12.

Next, an operation example of the training processing by the signal processing apparatus 115 will be described.

FIG. 13 is a diagram showing a flow of the training processing by the training processing unit 115. As shown in FIG. 13, the signal processing unit 601 sets the number of microphone devices M, the number of speakers K, and the order of rotational symmetry N (step SB1). In step SB1, the condition setting unit 601 sets an arrangement combination of the number of microphone devices M, the number of speakers K, and the order of rotational symmetry N in correspondence to a neural network to be generated. For example, if a trained neural network having three-fold symmetry as shown in the foregoing example is to be generated, the number of microphone devices M is set to 7, the number of speakers K is set to 3, and the order of rotational symmetry N is set to 3. The condition setting unit 601 sets the number of microphone devices M, the number of speakers K, and the order of rotational symmetry N in accordance with the values designated by the user via the input device 14. The condition setting unit 601 in step SB1 may set other training conditions that are set when training of a neural network is conducted, such as a loss function, a maximization method, a regularization function, a training coefficient, the number of layers, etc.

After step SB1, the sorting unit 602 sorts the weights based on the conditions set in step SB1, namely the number of microphone devices M, the number of speakers K, and the order of rotational symmetry N (step SB2). First in step SB2, an untrained neural network is read by the training processing unit 114. Then, the sorting unit 602 sorts the weights included in the weight matrix set between neighboring layers in the untrained neural network and determines a weight combination. After step SB2, the training unit 603 assigns the same weight parameters to the weight belonging to the same weight combination set in step SB2 (step SB3).

FIG. 15 is a schematic diagram showing a determination of weight combinations and setting of weight parameters performed in steps SB2 and SB3. The top part of FIG. 15 shows an initial weight matrix $W^{(1)}$. The bottom part of FIG. 15 shows a weight matrix after the sorting. The input layer has M channels corresponding to M microphone devices M, and the first hidden layer has K channels corresponding to K speakers. As a connection between the input layer and the first hidden layer is a full connection, the weight matrix $W^{(1)}$ representing the connection between the input layer and the first hidden layer has K×M weights, $W_{km}^{(1)}$. k is a row number and it is an integer between 1 to K and corresponds to a speaker number or an output channel number. m is a row number and it is an integer between 1 to M and corresponds to a microphone device number or an input channel number. In FIG. 15, similarly to step SB1, the number of microphone devices M is 7, the number of speakers K is 3, and the order of rotational symmetry N is 3, and the weight matrix W(l) has 3×7=21 weights $w_{km}^{(1)}$.

As shown in FIGS. 8 and 9, the arrangement of three sound source direction ranges and seven microphone devices has three-fold symmetry. For this reason, if the basic arrangement is rotated 120 degrees for example, the correspondence between the sound source direction range Rα and the microphone device MA is equal to the correspondence between the sound source direction range Rγ and the microphone device ME, and if the arrangement is further rotated 120 degrees, the correspondence between the sound source direction range Rα and the microphone device MA is further equal to the correspondence between the sound source direction range Rβ and the microphone device MC. Thus, as shown in the bottom part of FIGS. 8 and 15, $w_{11}^{(1)}$, $w_{23}^{(1)}$, and $w_{35}^{(1)}$ are set with the same weight combination. A common weight parameter, $w_1^{(1)}$, is assigned to $w_{11}^{(1)}$, $w_{23}^{(1)}$, and $w_{35}^{(1)}$.

Similarly, as shown in FIGS. 8 and 9, because of the three-fold symmetry, the correspondence between the sound source direction range Rα and the microphone device MB is equal to the correspondence between the sound source direction range Rγ and the microphone device MF and to the correspondence between the sound source direction range Rβ and the microphone device MD. Since the arrangement of three sound source direction ranges and seven microphone devices has two-fold symmetry having a symmetry axis connecting the microphone devices MA and MD, the correspondence between the sound source direction range Rα and the microphone device MB is equal to the correspondence between the sound source direction range Rα and the microphone device MF. The correspondence between the sound source direction range Rα and the microphone device MF is equal to, in consideration of the three-fold symmetry, the correspondence between the sound source direction range Rγ and the microphone device MD, and the correspondence between the sound source direction range Rβ and the microphone device MB. Therefore, $w_{12}^{(1)}$, $w_{16}^{(1)}$, $w_{22}^{(1)}$, $w_{24}^{(1)}$, $w_{34}^{(1)}$, and $w_{36}^{(1)}$ are set to a same weight combination. A common weight parameter, $w_2^{(1)}$, is assigned to $w_{12}^{(1)}$, $w_{16}^{(1)}$, $w_{22}^{(1)}$, $w_{24}^{(1)}$, $w_{34}^{(1)}$, and $w_{36}^{(1)}$.

The other weights included in the weight matrix can be sorted using a similar method. Since the correspondence between the sound source direction range Rα and the microphone device MG is equal to, in consideration of the three-fold symmetry, the correspondence between the sound source direction range Rγ and the microphone device MG and to the correspondence between the sound source direction range Rβ and the microphone device MG, the weights $w_{17}^{(1)}$, $w_{27}^{(1)}$, and $w_{37}^{(1)}$ are set to a same weight combination. Thus, a common weight parameter, $w_7^{(1)}$, is assigned to $w_{17}^{(1)}$, $w_{27}^{(1)}$, and $w_{37}^{(1)}$.

Both the hidden layer and the output layer have K channels. Thus, the weight matrix $W^{(i)}$ for the connection between the hidden layers or between the hidden layer and the output layer has K×K weight parameters $w_{kiko}^{(i)}$. ki is an integer between 1 and K and indicates an input channel number, and ko is an integer between 1 and indicates an output channel number. The weight parameter $w_{kiko}^{(i)}$ can also be sorted using N-fold symmetry, as shown in expression (18).

After step SB3, the acquisition unit 111 acquires training data (step SB4). The training data includes input data and teacher data. The input data corresponds to input vectors of a neural network. For example, as described in the first embodiment, if the input vectors input to a neural network are frequency spectra, the frequency spectra may be acquired as input data. The teacher data corresponds to the output vectors of a neural network. For example, as described in the foregoing embodiment, if the output vectors of a neural network are frequency masks, the frequency masks are acquired as teacher data.

The training data may be generated based on detection signals that are output through actual collection of speech by microphone devices (a first generation method) or may be generated by simulation (a second generation method).

With the first generation method, speech from three sound source direction ranges is collected by seven microphone devices, and M detection signals are thereby collected. The acquisition unit 111 performs preprocessing on each detection signal and converts it to an input vector that is input into the neural network. The input vectors are used as input data of training data. For example, if the input vectors of the neural network are frequency spectra, the acquisition unit 111 performs A/D conversion on the detection signals to generate digital signals and subsequently performs short-term Fourier transform on the digital signals to generate frequency spectra.

With the second generation method, the acquisition unit 111 generates input data by simulation. Specifically, the acquisition unit 111 multiplies the frequency spectra of K sound source direction ranges with a gain and sums the frequency spectra, thereby generating M frequency spectra in simulation of a conversation between K persons. The generated M frequency spectra are used as input data. The acquisition unit 111 generates frequency masks of K sound source direction ranges based on M frequency spectra and the gain. The generated K frequency masks are used as teacher data.

After step SB4, the training unit 603 trains an untrained neural network (step SB5). In step SB5, the training unit 603 trains, based on the training data acquired in step SB1, an untrained neural network in which a same weight parameter is assigned to the weights belonging to each weight combination in step SB4. The loss function is defined by cross entropy of the output vectors and the teacher data. The training unit 603 trains the weight parameters by an error back propagation method, etc. For example, the training unit 603 performs forward propagation processing through application of an untrained neural network to the input vectors, and then outputs the estimated output vectors. Next, the training unit 603 performs back propagation processing by applying the untrained neural network to errors between the estimated output vectors and the correct output vectors which are training data, and calculates a gradient for the loss function relating to the weight parameters. Then, the training unit 603 updates the weight parameters of the untrained neural network based on the gradient. The trained neural network is generated by updating the weight parameters through repeating forward propagation processing and back-propagation processing on multiple sets of training data. The generated trained neural network is associated with a combination of the number of microphone devices M, the number of speakers K, and the order of rotational symmetry N set in step SB1.

According to the present embodiment, since a common weight parameter is assigned to each weight combination for multiple weights included in a weight matrix, the substantial number of weight parameters is smaller than in a case where different weight parameters are assigned to each of the multiple weights, and it is possible to reduce a cost in calculation required by the training processing.

If no constraints are imposed on a neural network, training data of the following seven patterns of speech is collected: (1) speech from a sound source direction range Rα; (2) speech from a sound source direction range Rβ; (3) speech from a sound source direction range Rγ; (4) speech from sound source direction ranges Rα and Rβ; (5) speech from sound source direction ranges Rβ and Rβ; (6) speech from sound source direction ranges Rα and Rγ; and (7) speech from sound source direction ranges Rα, Rβ, and Rγ. For each speech pattern (1) through (7), speech from 12 directions in steps of 5 degrees in each sound source direction range is collected. For example, if the sound source direction range is 60 degrees, speech is collected from 12 directions.

If constrains imposed on a neural network as in the present embodiment, there is no need to collect speech of all patterns (1) through (7). Since the accuracy of the sound source separation processing depends on a relative positional relationship between the microphone devices and the speakers or sound source direction ranges, speech patterns from a positional relationship having N-fold symmetry can be shared. For example, the speech pattern (1) may be used as the speech patterns (2) and (3), and the speech pattern (4) may be used as the speech patterns (5) and (6); thus, at least training data relating to the speech patterns (1), (4), and (7) should be collected. Therefore, according to the present embodiment, it is possible to generate a trained neural network with high accuracy from a smaller number of training samples.

The signal processing apparatus 1 according to a first aspect of the present embodiment includes processing circuit 11. The processing circuit 11 acquires M detection signals output from M detector devices having N-fold symmetry (M is an integer equal to or greater than 2, and N is an integer equal to or greater than 2). Each of the M detector devices detects original signals generated from K signal sources (K is an integer equal to or greater than 2) having the N-fold symmetry. The processing circuit 11 applies a trained neural network to M input vectors corresponding to the M detection signals and outputs K output vectors. The same parameter is set to, of multiple weights included in a weight matrix of the trained neural network, the weights that are commutative based on N-fold symmetry.

The signal processing apparatus 1 according to a second aspect of the foregoing embodiment is a training apparatus that trains a neural network into which M input vectors corresponding to M detector devices having N-fold symmetry are input (M is an integer equal to or greater than 2, and N is an integer equal to or greater than 2) and which outputs K output vectors corresponding to K signal sources having N-fold symmetry (K is an integer equal to or greater than 2). The signal data processing apparatus 1 includes the processing circuit 11. The processing circuit 11 determines a combination of commutative weights of multiple weights included in a weight matrix of a neural network, in terms of the symmetrical operation based on N-fold symmetry based on the number of microphone devices M, the number of speakers K, and the order of rotational symmetry N. The processing circuit 11 assigns the same parameter to multiple weights belonging to the same weight combination and trains a neural network, and generates a trained neural network.

According to the above configuration, since the same weight parameter is set to the commutative weights of multiple weights included in a weight matrix of a trained network, based on N-fold symmetry, it is possible to reduce the number of weight parameters and to maintain a normal operation at the same time, compared to a neural network not having rotational symmetry. Therefore, it is thereby possible to reduce process loads relating to the signal source separation processing and an amount of memory required for storing weight parameters. Furthermore, in the aspect of training a neural network, the reduction in the number of weight parameters also leads to reduction in calculation loads imposed on the training processing. With consideration given to rotational symmetry, there is no need to prepare training data sets corresponding to all the signal source arrangement patterns; therefore, it is possible to reduce loads in collecting training data and to improve training efficiency. Thus, according to the present embodiment, it is possible to realize signal source separation with high accuracy and low work load.

Modification 1

In the foregoing embodiment, the sound source separating unit 202 of FIG. 3 is configured to output speech spectra separated according to speaker. The sound source separating unit 202 according to Modification 1 outputs acoustic scores corresponding to the speech separated according to speaker. The acoustic scores are vectors of scores indicating a likelihood in terms of predetermined units, such as morphemes or syllables. The speech recognition unit 203 according to Modification 1 generates text data based on acoustic scores. For example, the speech recognition unit 203 compares the acoustic scores to a pronunciation dictionary or a language model to generate word sequences with high likelihood, and generates text data based on the word sequences.

FIG. 16 is a diagram showing a functional configuration example of the sound source separating unit 202 according to Modification 1. The sound source separating unit 202 according to Modification 1 includes the STFT unit 301 and the application unit 401. The STFT unit 301 is the same as that in the foregoing embodiment. The application unit 401 applies a trained neural network according to Modification 1 to M frequency spectra to output K acoustic scores. The trained neural network according to Modification 1 is trained in such a manner that K acoustic scores are output in response to an input of M frequency spectra. The trained neural network according to Modification 1 and that of the foregoing embodiment are the same in their network configurations and constraints on the weight matrix but they differ in their output vectors, and Modification 1 outputs acoustic scores as the output vectors.

The index according to a morpheme type is defined as p ($1 \leq p \leq 30$) and an acoustic score of a k-th speaker is defined as Pk(p,n), and the output vector y(n) is defined by expressions (52) and (53).

$$y(n) = [P_1(n)^T, P_2(n)^T, P_3(n)^T]^T \quad (52)$$

$$P_k(n) = [P_k(1,n) P_k(2,n), \ldots, P_k(30,n)]^T \quad (53)$$

The calculation of the output layer of the neural network is defined by expressions (54) through (56). Herein, softmax ( ) represents a soft max function.

$$P_1 = \text{softmax}(w_1^{(4)} h_1^{(3)} + w_2^{(4)} h_2^{(3)} + w_3^{(4)} h_3^{(3)}) \quad (54)$$

$$P_2 = \text{softmax}(w_3^{(4)} h_1^{(3)} + w_1^{(4)} h_2^{(3)} + w_2^{(4)} h_3^{(3)}) \quad (55)$$

$$P_3 = \text{softmax}(w_2^{(4)} h_1^{(3)} + w_3^{(4)} h_2^{(3)} + w_1^{(4)} h_3^{(3)}) \quad (56)$$

As training data according to Modification 1, the same speech data as that in the foregoing embodiment can be used. The teacher data is generated as described below, for example. The acquisition unit 111 transcribes speech data of each speaker and converts it to a morpheme sequence, and calculates a vector row in which a score of a correct morpheme is "1" and scores of the other morphemes are "0" for each frame in an attempt to determine an alignment between the speech data and the morpheme sequence. The vector row is used as teacher data. The training unit 603 defines the loss function by cross entropy of an output vector and teacher data, and trains the weight parameters by a known method such as an error backpropagation method.

In Modification 1, as optimization is achieved through a conjunction of separation of sound sources with an acoustic model, improvement in the accuracy of speech recognition is expected. As the rotational symmetry is the same as that in the foregoing embodiment, the reduced number of weight parameters leads to a smaller amount of calculation performed for the training and the separation and recognition processing.

Modification 2

In Modification 1, the sound source separating unit 202 outputs acoustic scores. In Modification 2, the sound source separating unit outputs language scores. The output vectors in this case are vectors in which the number of dimensions per speaker is equal to the number of words, and elements of the vectors are scores of a likelihood of a word corresponding to each dimension. According to Modification 2, it is possible to optimize the training and the separation processing with a neural network including a language model, and improvement accuracy in the recognition is expected.

Modification 3

In the foregoing embodiment, it is assumed that one speaker is present in a single sound source direction range; however, multiple speakers may be present in a single sound source direction range. If multiple speakers simultaneously produce speech in a single sound source direction range, the trained neural network processes these sounds as speech from a single sound source direction range and therefore cannot separate the speech according to speaker. Therefore, if multiple speakers are present in a single sound source direction range, it is desirable if those speakers are not allowed to speak simultaneously. In this case, a sound that announces prohibition of simultaneous speech may be output through a speaker device. In other words, time intervals are put between speech produced from two or more speakers included in the same sound source direction range. It is thereby possible for the sound source separating unit 202 to output speech spectra of a single channel in which a plurality of speech spectra corresponding to a plurality of speakers are separated in terms of time. In this case, the speech recognition unit 203 performs analysis on speech spectra including a plurality of speech spectrum components respectively corresponding to a plurality of speakers based on, for example, characteristics of the voice of each speaker and separates the speech spectrum components according to speaker. Thereafter, speech recognition can be performed on the speech spectrum of each of the speakers and text data that describes content of the speech of each speaker can be output.

Modification 4

In the foregoing embodiment, it is assumed that the neural network has a full connection; however, the embodiment is not limited to that example and any type of network configuration may be adopted. For example, various types of network configurations, such as a convolutional neural network (CNN), a recurrent neural network (RNN), or a long short-term memory (LSTM), which is a variation of the RNN, may be adopted.

Modification 5

In the foregoing embodiment, it is assumed that the information processing apparatus 1 includes the detector device (microphone device) 13. However, the information processing apparatus 1 does not necessarily have to include a detector device 13, as long as it is able to acquire detection signals output from an external detector device 13.

Modification 6

In the foregoing embodiment, separation of speech signals according to speaker is described as an example of the signal source separation processing; however, this embodiment is not limited thereto. For example, the signal source separation processing according to the present embodiment is applicable to the separation of radio wave signals by transmit antennas. In this case, a transmit antenna is a signal source, a radio wave signal is an original signal, and a receiver antenna is the detector device 13.

The function of each unit according to the present embodiment or a program executed to cause a computer to realize the function may be stored in a non-transitory computer readable storage medium.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A signal processing apparatus comprising:
an acquisition unit configured to acquire M detection signals output from M detector devices (M is an integer equal to or greater than 2) having N-fold symmetry integer equal to or greater than 2), each of the M detector devices detecting an original signal generated from K signal sources (K is an integer equal to or greater than 2) having the N-fold symmetry; and
an application unit configured to apply a trained neural network to M input vectors corresponding to the M detection signals and output K output vectors,
wherein a same parameter is set to, of a plurality of weights included in a weight matrix of the trained neural network, weights that are commutative based on the N-fold symmetry.

2. The apparatus according to claim 1, wherein
the detector devices are microphone devices,
the detection signals are speech signals, and
the output vectors are one of a speech spectrum, a time-frequency mask, an acoustic score, or a linguistic score.

3. The apparatus according to claim 2, wherein
the input vectors are complex spectra, and
the plurality of weights includes complex numbers.

4. The apparatus according to claim 1, wherein
the detector devices are microphone devices,
the detection signals are speech signals, and
the application unit applies the trained neural network to the M input vectors and outputs, as the K output vectors, K speech spectra respectively corresponding to the K signal sources.

5. The apparatus according to claim 4, further comprising:
a speech recognition unit configured to perform speech recognition on the K speech spectra and output K sets of text data relating to speech content.

6. The apparatus according to claim 1, wherein
the detector devices are microphone devices,
the detection signals are speech signals, and
the application unit applies the trained neural network to the M input vectors and outputs, as the K output vectors, K acoustic scores respectively corresponding to the K signal sources.

7. The apparatus according to claim 6, further comprising:
a speech recognition unit configured to perform speech recognition on the K acoustic scores and output K sets of text data relating to speech content.

8. The apparatus according to claim 4, further comprising:
an A/D conversion unit configured to perform A/D conversion on the M detection signals to convert them into M digital signals; and
a Fourier transform unit configured to perform short-term Fourier transform on the M digital signals to generate M frequency spectra as the M input vectors.

9. The apparatus according to claim 6, further comprising:
an A/D conversion unit configured to perform A/D conversion on the M detection signals to convert them into M digital signals; and
a Fourier transform unit configured to perform short-term Fourier transform on the M digital signals to generate M frequency spectra as the M input vectors.

10. The apparatus according to claim 1, wherein a first direction range in which, of K direction ranges respectively corresponding to the K signal sources when viewed from the M detector devices, two or more signal sources are present, original signals are produced with time intervals therebetween from the two or more signal sources included in the first direction range.

11. The apparatus according to claim 1, wherein
the trained neural network includes:
M input channels into which the M input vectors are input respectively, and
K output channels which output the K output vectors respectively, and
if the correspondence between the M input vectors and the M input channels is changed by rotating the M detector devices in such a manner that the M detector devices overlap according to the N-fold symmetry, the correspondence between the K output vectors and the K output channels is changed before and after the rotation, whereas the K output vectors remain unchanged before and after the rotation.

12. A signal processing apparatus comprising:
a signal processing unit configured to train a neural network into which M input vectors corresponding to M detector devices having N-fold symmetry are input (M is an integer equal to or greater than 2, and N is an integer equal to or greater than 2) and which outputs K output vectors corresponding to K signal sources having N-fold symmetry (K is an integer equal to or greater than 2);
a determination unit configured to determine a combination of commutative weights, among a plurality of weights included in a weight matrix of the neural network, in terms of a symmetrical operation based on an order of rotational symmetry N based on a number of microphone devices M, a number of speakers K, and the order of rotational symmetry N; and
a training unit configured to assign a same parameter to multiple weights belonging to a same weight combination and train the neural network, and generate a trained neural network.

13. The apparatus according to claim 12, wherein
the training unit trains the neural network based on training data,
the training data has training data of a plurality of speech patterns corresponding to combinations of the K signal sources, and
of the plurality of speech patterns, speech patterns having the N-fold symmetry share a same speech pattern.

14. A non-transitory computer readable medium storing instructions that cause a computer to:
output K output vectors corresponding to K signal sources having N-fold symmetry based on an input of M input vectors corresponding to M detector devices having N-fold symmetry (each of M, N, and K is an integer equal to or greater than 2) applied to a neural network, wherein a same parameter is set to, of multiple weights included in a weight matrix of the neural network, weights that are commutative based on the N-fold symmetry.

* * * * *